(12) United States Patent
Flores

(10) Patent No.: US 9,761,035 B1
(45) Date of Patent: Sep. 12, 2017

(54) DYNAMIC USER INTERFACES

(71) Applicant: Jeremy Flores, Santa Cruz, CA (US)

(72) Inventor: Jeremy Flores, Santa Cruz, CA (US)

(73) Assignee: MINDSTREAM INTERFACE DYNAMICS, INC., Daly City, CA (US)

(*) Notice: Subject to any disclaimer, the term of this patent is extended or adjusted under 35 U.S.C. 154(b) by 128 days.

(21) Appl. No.: 14/636,350

(22) Filed: Mar. 3, 2015

Related U.S. Application Data

(60) Provisional application No. 61/947,338, filed on Mar. 3, 2014.

(51) Int. Cl.
*G06T 13/80* (2011.01)

(52) U.S. Cl.
CPC .................... *G06T 13/80* (2013.01)

(58) Field of Classification Search
None
See application file for complete search history.

(56) References Cited

U.S. PATENT DOCUMENTS

| | | | |
|---|---|---|---|
| 5,581,276 A | 12/1996 | Cipolla et al. | |
| 5,886,697 A * | 3/1999 | Naughton | H04L 29/06 345/473 |
| 2004/0233201 A1* | 11/2004 | Calkins | G06T 13/00 345/473 |
| 2012/0162251 A1* | 6/2012 | Minamino | G11B 27/34 345/629 |

OTHER PUBLICATIONS

IBM Knowledge Center. http://www-01.ibm.com/support/knowledgecenter/ Retrieved on May 8, 2015.

* cited by examiner

*Primary Examiner* — Yi Wang
(74) *Attorney, Agent, or Firm* — Weiss & Moy, P.C.; Jeffrey D. Moy

(57) ABSTRACT

Methods and systems for dynamic user interfaces are provided. A user interface allows a user to receive information about a computer system's state and to make changes to state, such as with touch screen devices. Dynamic user interfaces provide advanced methods of interfacing with the computer system, receiving information, and changing computer state. Advanced methods include improved gestural controls like interrupting or fast-forwarding an animated transition. Advanced methods of receiving information from the computer system are also provided, such as real-time data updates mid-animation and meaning conveyed through motion of and/or configuration change of UI elements. Defined animation pathways in the system can have different relative velocities as a function of percentage completion regardless of the duration(s) of the animation pathways, allowing for more fluid UIs. The methods and systems allow for the rapid creation, management, and iteration of meaningful user interfaces and complex animation types.

24 Claims, 20 Drawing Sheets

DYNAMIC USER INTERFACES

CROSS-REFERENCE TO RELATED APPLICATIONS

This application claims priority to and benefit of U.S. Provisional Patent Application No. 61/947,338, filed on Mar. 3, 2014, entitled DYNAMIC USER INTERFACES, the contents of which are incorporated herein by reference in their entirety for all purposes.

BACKGROUND

A computer system typically has a user interface (UI) that enables a user to interface with the computer system, including one or more applications executed on the computer system, and receive feedback from the computer system. A user interface can be presented to the user on an electronic display of the computer system.

User interfaces can present information to users in the form of text. A graphical user interface (GUI) is a type of user interface that allows users to interact with electronic devices through graphical icons and visual indicators, such as secondary notation.

SUMMARY

While there are user interfaces present available, recognized herein are limitations associated with such user interfaces. For example, current user interfaces may be relatively static and unable to present information to users in a dynamic fashion. As another example, currently animation systems may be designed to add ad-hoc ornamentations on top of inherently static user interface (UI) layouts, which can limit creative freedom and create a constrained user experience.

The present disclosure provides dynamic and animatable user interfaces. User interfaces of the present disclosure offer greater degrees of meaningful information to application users so that they can successfully and smoothly interact with and navigate through an application. Information such as prompts, hints, responses to input, and navigation cues can be delivered to the user by animations, transitions, and user interface element configuration or state. Systems of the present disclosure can communicate real-time changes in application and/or operating system (OS) state through the UI.

The present disclosure provides methods and systems to create user interfaces that make appropriate use of animations, transitions, and user interface element configurations or state. Such methods and systems can allow for the rapid creation, management, and iteration of advanced user interfaces and complex animation types.

An aspect of the present disclosure provides methods for displaying an animation in a user interface of an electronic device of a user, comprising providing a computer system comprising a computer processor and an electronic display coupled to the computer processor. The computer processor can be programmed to display on the electronic display a user interface (UI) having at least a first animation pathway and a second animation pathway. The animation pathways can be programmed to be executed independently of one another with percentage completion. Next, using the computer processor, the user interface is generated and displayed. The user interface comprises at least the first animation pathway and the second animation pathway on the electronic display. The animation pathways can have different relative velocities as a function of percentage completion regardless of the duration(s) of the animation pathways.

Another aspect of the present disclosure provides methods for displaying an animation in a user interface of an electronic device of a user, comprising providing a computer system comprising a computer processor and an electronic display coupled to the computer processor. The computer processor can be programmed to display on the electronic display a user interface (UI) having at least a first animation pathway and a second animation pathway. The animation pathways can be programmed to be executed independently of one another with percentage completion. Next, the user interface is generated and displayed. The user interface can have at least the first animation pathway and the second animation pathway on the electronic display. The animation pathways can be associated with the same UI element(s). At least a portion of the animations pathways can be displayed on the electronic display at the same time, and the animations pathways can be associated with separate UI elements. Upon generation and display on the electronic display, the UI elements can act in unison maintaining individuality through different styles of movement and appearance.

Another aspect of the present disclosure provides machine executable code that upon execution by one or more computer processors implements any of the methods above or elsewhere herein.

Another aspect of the present disclosure provides a computer system comprising one or more computer processors and memory coupled to the one or more computer processors. The memory comprises machine executable code that upon execution by the one or more computer processors implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "FIG." and "FIGs." herein), of which:

DETAILED DESCRIPTION

Figure 1:
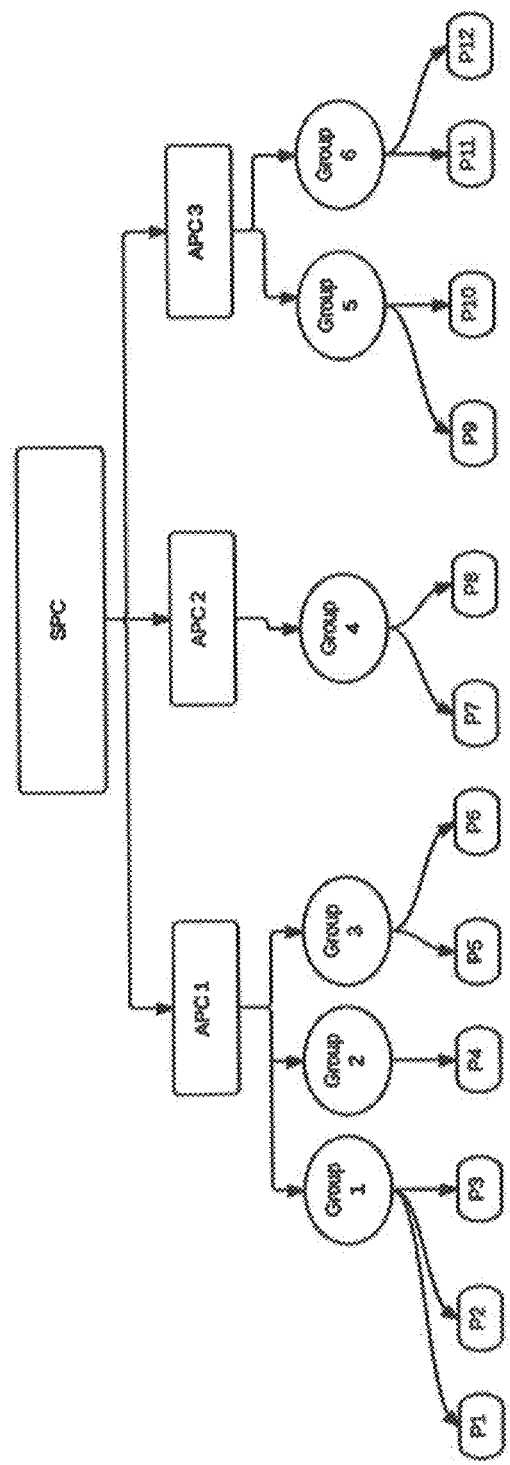
FIG. 1 is an example system overview of animation pathways.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "user," as used herein, generally refers to an individual or entity that configures (or otherwise prepares) or views a user interface, including one or more animations. In an example, a user is an individual that is operating an application on an electronic device. In another example, a user is a developer that is configuring a user interface to display one or more animations upon execution by an electronic device.

The present disclosure provides for systems, devices, and methods for creating highly animatable user interfaces on a computer system (or device). An exemplary device can be a personal computer (PC), mobile phone (e.g., smart phone), laptop, netbook, or tablet, or any device that uses a screen. For example, a computer system or device can be a smart phone (e.g., Apple® iPhone or Android® enabled phone) or tablet or slate PC (e.g., Apple® iPad). Systems of the present disclosure may also be compatible with non-screen based systems, such as three-dimensional (3D) or holographic displays, and tangible/tactile displays. A range of user input styles or devices are also compatible with systems provided herein, such as motion capture, touch input, or other gesture-based devices.

Animatable user interfaces of the present disclosure can be created without any of the disadvantages of traditional animation techniques, including key frames and standard animation systems, which limit creative freedom and create a constrained user experience. Such standard animation systems may only comprise static user interface (UI) layouts with animations used solely as ornamentations.

Systems, devices, and methods for creating user interfaces include the ability to powerfully and conveniently manage and display composable animations and transitions that can correspond to changes in application state, which allows for advanced user experience metaphors and visual data representation as compared to traditional techniques.

User interface systems of the present disclosure can generalize, encompass, and supersede existing animation approaches and can be designed to seamlessly integrate with existing user interface frameworks. Any view object with display properties, such as x-position, scale, or alpha, can be animated. Systems of the present disclosure can also be designed to allow for other systems to modify display properties, in some cases as long as the system is not concurrently modifying the display properties.

Animations

An aspect of the present disclosure provides computer systems that are programmed to display animatable user interfaces. In some embodiments, a computer system (also "system" herein) has a user interface that can be displayed on an electronic display of the computer system. The computer system can be an electronic device of a user. The user interface can include user interface elements (e.g., graphical objects, text, menu bars, etc.) that can be dynamically animated. The user interface can be associated with an application or an operating system (OS) of the computer system.

In an application with a total of n views, where each view has m animatable properties, the application user interface (UI) will be described as a configuration space with m*n dimensions, where each animatable property for each view of an application is a dimension of this space. Each point in the configuration space represents a potential configuration of how the application—in particular all of its views—can be drawn (or rendered) on an electronic display of an electronic device of a user. The system may allow for the addition and removal of views, and by extension, a change in the number of dimensions. Also, any view can have an arbitrary number of dimensions such that the number of dimensions need not be equal for any two views.

For example, an application with two views, a label L and button B, each with animatable properties x-position, y-position, alpha, and rotation, may be represented as a UI configuration space with the following dimensions:

($x_L$, $y_L$, $alpha_L$, $rotation_L$, $x_B$, $y_B$, $alpha_B$, $rotation_B$)

A user can define and work with configuration points to represent UI configurations. Using the systems in the present disclosure, a developer can use a configuration point in an advanced animation. An example UI configuration point for this application can be the point (p) in the UI configuration space:

p=(20, 50, 1.0, 0.0°, 100, 20, 0.5, 90°)

Animations of the present disclosure can be thought of as the process of interpolating from one configuration point to another in the UI configuration space. Animations may be thought of as motion or traversal within a configuration space, starting at one point and arriving at another point. For example, the system can animate from the original configuration point p to another point q in order to fade out the label L and rotate the button B to 0° as follows:

p=(20, 50, 1.0, 0.0°, 100, 20, 0.5, 90°)→q=(20, 50, 0.0, 0.0°, 100, 20, 0.5, 0.0°)

The system can calculate the change in values of the animatable properties between configuration point p and configuration point q. Such calculation can make use of one or more intermediate points. The system can drive the transition from point p to point q, either by a timer or by any developer-provided possibly non-deterministic input, such as user gestures or file download progression.

In some cases, a system requiring that the starting location of an animation be predefined can limit application behavior. Animations may not be aborted or rerouted until they are completed, otherwise a discontinuous jump from an interpolated point to a predefined starting point can be made for a new animation to commence, causing a "glitchy", unnatural animation to display. In some cases, systems and methods of the present disclosure are able to avoid such shortcoming by requiring only a destination point (final UI configuration point) instead of both a starting UI configuration point and destination point. If only a destination point is provided, then the system interpolates from the currently-displayed point to the destination point, thus ensuring that no discontinuous jumps (and therefore unnatural animations) may occur (unless expressly desired).

The system can rely on the views to keep track of their current state and is able to capture the currently-displayed configuration point and use it as the starting point, thereby allowing the system to focus only on destination configurations. This provides greater freedom in traversing within a UI configuration space, allowing the application (or OS) to move from any configuration point (either explicitly defined or interpolated) to any other configuration point.

FIG. 1 is an example system overview of animation pathways. A superpathway coordinator (SPC) is coupled to at least one animation pathway coordinators (APC). In the illustrated example, the SPC is coupled to three APC's (APC 1, APC 2 and APC 3). Each APC is coupled to a group with at least one animation pathway (P). An animation pathway (P) is a collection of partial configuration space coordinates called waypoints, each associated with a percentage. That is, a pathway is a collection of chosen (or predetermined) values for chosen parameters that can change over time.

The system can have one or more subspaces. In cases in which the system has multiple subspaces, a single subspace can be animated at a given time. For example, a first subspace can be animated first and a second subspace can be animated later. As an alternative, at least a subset of the subspaces can be animated simultaneously (or at the same time) or substantially simultaneously.

A Group is a useful collection of pathways. For example, pathways responsible for each of a widget's animatable properties can be grouped together. Likewise, pathways for different widgets that function together can be grouped together. A user can add any number of pathways to a group, so long as dimensions are orthogonal, that is, they do not overlap, so that no two pathways are set to change a value of the same parameter at the same time.

The system overview of FIG. 1 can be a user-defined series of relationships that exist in a configuration space with dimensions that are made up of all potential values of all potential animatable properties in a user interface.

Each of the APCs coordinates pathways by arranging them in groups and managing the animation process. When the system instructs the APC to animate a group, the APC is responsible for animating all the pathways in the group. Multiple groups can be animated simultaneously so long as all pathways affected are orthogonal within and between groups. The contents of an APC can be equivalent to a subspace of the UI configuration space. Even though the APC can do all of the animation "work," the user may never have to interact with it directly.

The SPC coordinates APCs/subspaces of the configuration space. The user can do everything through the SPC, such as define pathways, groups, and subspaces. The SPC can be used in at least two different ways. Superpathways can be predefined for frequently used UI configurations. For example, in FIG. 1 a "Settings Screen" superpathway (e.g., a developer-defined useful configuration of one or more APCs that can be animated simultaneously) can be predefined to simultaneously animate APC1:G1,G3; APC2:G4; APC3:G6, and at any point in the future the user (developer) need only tell the SPC to animate to the "Settings Screen." The SPC can also be used in an adhoc manner to animate any combination of pathways, groups, or subspaces.

There can be more than one SPC per application. A given SPC can represent the entire configuration space of the user interface of the application by dividing the configuration space into APCs/subspaces with groups of animation pathways, as shown in FIG. 1. Dividing the configuration space into APCs/subspaces can permit the behavior of a particular set of dimensions/animatable properties to be dictated independently from the behavior of other dimensions.

Figure 2:
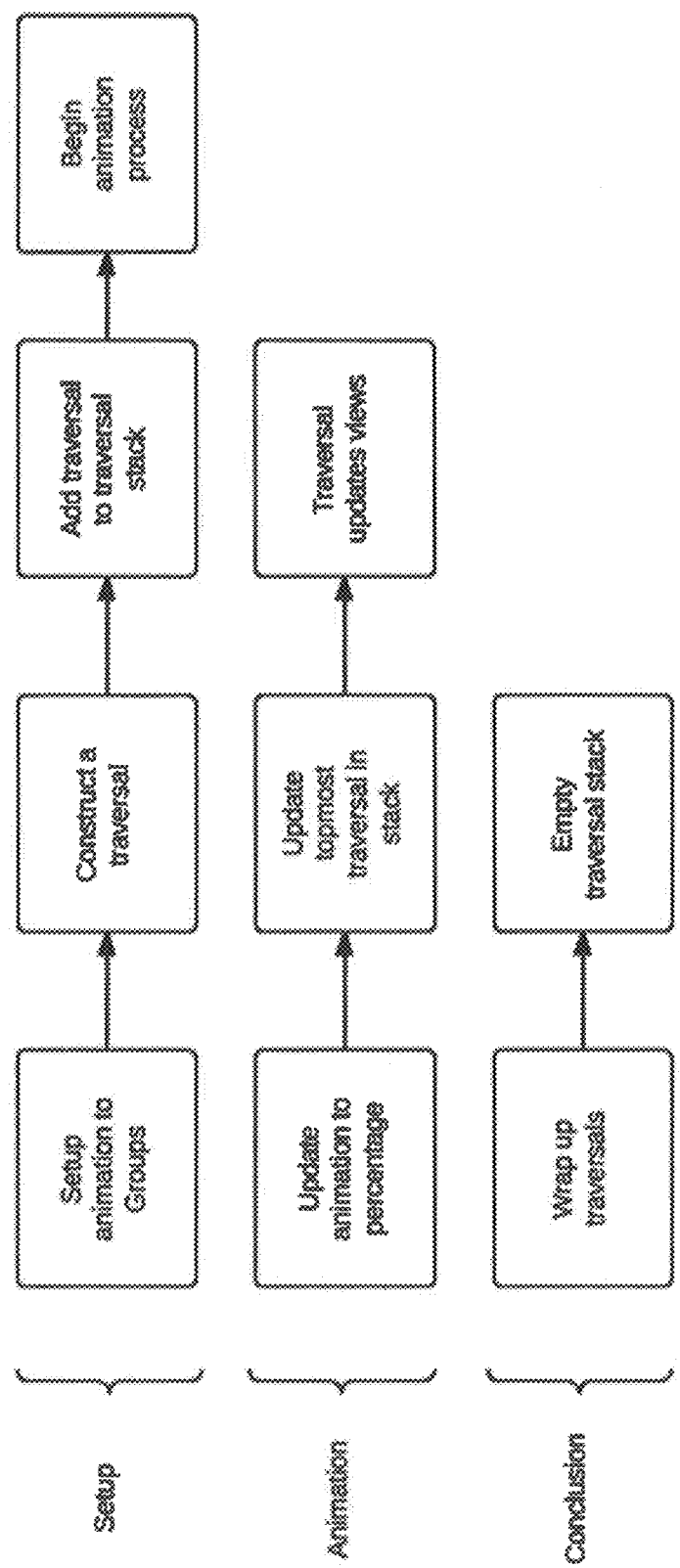
FIG. 2 is an overview of an example animation process.

FIG. 2 is an overview of an example animation process. A given animation can be handled by an APC, such as an APC of FIG. 1. An animation pathway can include coordinates for one view.

An animation pathway can be a series of uncalculated waypoints. Pathway groups can contain multiple pathways and allow pathways from different views to be simultaneously traversed when a UI is rendered.

A traversal can be a series of calculated waypoints determined from the uncalculated waypoints of pathways. The waypoints can be calculated during runtime.

An animation process and traversal stack can handle at least three types of animations, namely manual, automatic and jump, as well as interruptions. The system can perform multiple types of animations in a given UI element, and the system can interrupt an animation and continue or restart animation.

With reference to FIG. 2, during the setup of an example animation process, a user (e.g., developer) can set up animation groups, trigger the construction of a traversal by instructing the system to animate through a pathway group, add the traversal to a traversal stack and begin an animation process (e.g., if the stack is previously empty, otherwise it will instruct the system to pause the current animation process and begin and new animation process). During animation, an animation can be updated to a percentage. Next, a topmost traversal in a stack can be updated. The traversal can then update views. Upon the conclusion of a given animation, traversals can be wrapped up (including system bookkeeping and developer notifications) and the traversal stack can be emptied.

Figure 3:
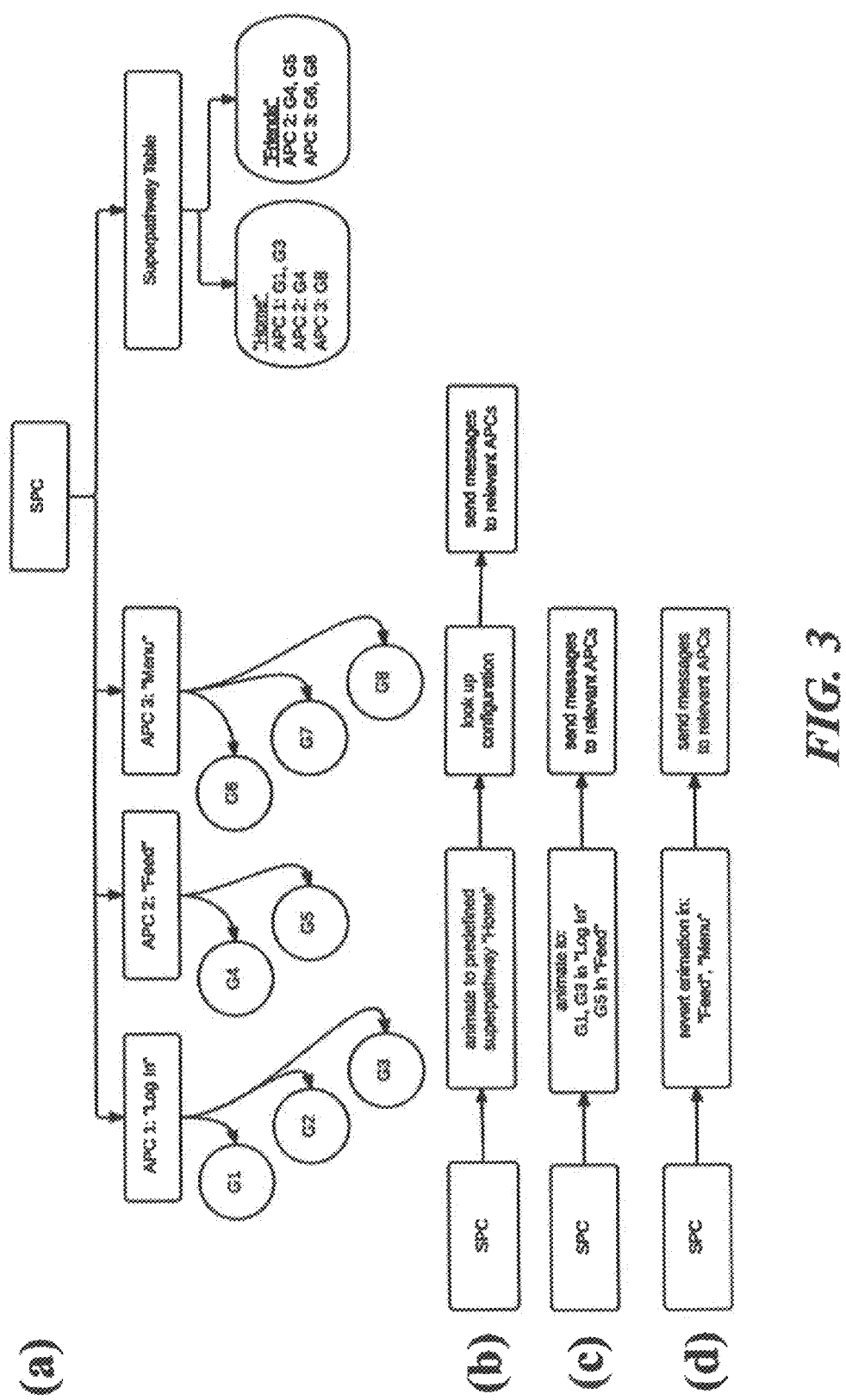
FIG. 3 shows an overview of an example superpathway coordinator (SPC) of a user interface.

FIG. 3 shows an overview of an example superpathway coordinator (SPC) of a user interface. The SPC of FIG. 3 can be used with the system of FIG. 1. APC 1 is associated with "Log In," APC 2 is associated with "Feed," and APC 3 is associated with "Menu." The SPC can trigger animations in at least two ways, such as by using predefined superpathways, as in FIG. 3(b), or in an ad-hoc basis, as in FIGS. 3(c) and 3(d).

The superpathway coordinator (SPC) enables a developer to manage multiple subspaces/APCs simultaneously, allowing for the planning and execution of complex user interfaces as well as further enabling a coalescence effect. The SPC can broadcast messages to the appropriate APCs. It may not duplicate the information stored in the APC itself and does not have any animation "machinery."

Developers (or other users) can interact solely with the SPC, allowing the developers to consider the UI as a whole throughout the development process. The developers can name and define subspaces/APCs according to UI functionality and can also define pathway groups and pathways.

The SPC can store superpathways, which are developer-defined useful configurations of one or more APCs that can be animated simultaneously. There may be outlets in the SPC for all functions of the APC, such as manual, automatic, and jump animations, as well as reversions and interruptions.

FIGS. 3(b)-3(d) have example work flows of the SPC. In FIG. 3(b), the SPC animates to a predefined superpathway "Home," assumes a lookup configuration, and sends messages to relevant APC's. The lookup configuration for "Home" corresponds to G1 and G3 (APC 1), G4 (APC 2) and G8 (APC 3). In FIG. 3(c), the SPC animates to G1 and G3 in APC 1 and G5 in APC 2, and subsequently sends messages to relevant APC's. In FIG. 3(d), the SPC reverts animation to APC 2 and APC 3, and subsequently sends messages to relevant APC's.

Animation Pathways and Waypoints

In some embodiments, existing key frame based animation systems define sequences of key frames to create an animation sequence. Current key frame based animation systems vary in what types UI elements they can accommodate, as well as how flexible they are in designing complex animations. Systems of the present disclosure can use animation pathways in place of key frame sequences to designate predefined paths of traversal through the UI configuration space.

Animation pathways are the most general form of key frame sequence, and the generality and flexibility of animation pathways allow for complex definitions of the appearance of an application.

Key frame systems of the present disclosure can encompass the more common animation system type where only the destination value and amount of time for the animations are defined by the user (e.g., developer). Such an animation can be represented by a single key frame in various key frame systems.

In some cases, starting point are provided. In other cases, starting points are not provided. Optionally-defined starting points may be extended to construct a new animation paradigm. A convergent animation pathway, or simply an animation pathway, is a sequence of UI configuration space "waypoints" that define a route to travel to some destination configuration point. A configuration waypoint is a configuration point that (1) allows null (Ø) and pin (Π) values (see below) as well as number values for animatable properties, and (2) has a percentage property. Each point in the sequence is a waypoint that must be traveled through to reach the end destination of the pathway. Each waypoint has a related percentage denoting its position in the pathway irrespective of time, with the currently-displayed starting configuration point defined to be at 0% and the end configuration point defined to be at 100%. The system allows for multiple pathways to define the same destination point. The multiple pathways can be at least partially overlapping, but in some cases the multiple pathways are not overlapping.

As an example to explain the use of waypoints and animation pathways, a newspaper application may have multiple display modes: a List mode for displaying a list of news articles, a Details mode for showing the details of a chosen article, and a Settings mode with widgets to configure the application. The application can be executed on an electronic device of a user, such as a mobile electronic device. In this example, the view of each mode can fill the whole screen. From a UI configuration perspective, each mode can have a unique point to represent that the current mode is on-screen/visible while the inactive modes are offscreen/invisible. The transitions between each of these modes can be an interpolation from the exiting mode's point to the entering mode's point.

(Note that screen is 320 pixels by 480 pixels, with x=0, y=0 on bottom left.)

The pathways describing each focus mode are:

| Percentage | Configuration Waypoint $(x_L, y_L, alpha_L, rotation_L, scale_L, x_D, y_D, alpha_D, rotation_D, scale_D, x_S, y_S, alpha_S, rotation_S, scale_S)$ |
|---|---|
| | $List_{Focus}$ |
| 100% | (0, 0, 1.0, 0°, 1.0, 320, 0, 1.0, 0°, 1.0, 0, 480, 1.0, 0°, 1.0) |
| | $Details_{Focus}$ |
| 100% | (0, 0, 0.0, 0°, 1, 0, 0, 1.0, 0°, 1, 0, 480, 1.0, 0°, 1) |
| | $Settings_{Focus}$ |
| 100% | (0, 0, 0, 0°, 1, 320, 0, 0, 0°, 1, 0, 0, 1.0, 0°, 1) |

Using animation pathways, the animation can be augmented to the Settings Focus mode so that 50% of the way into the animation, the Settings View S is rotated 45° clockwise, at 75% to 45° counterclockwise, and at 100% to 0°.

The Settings Focus convergent animation pathway can therefore be:

| Percentage | Configuration Waypoint |
|---|---|
| 50% | (..., $rotation_S = 45°$, ...) |
| 75% | (..., $rotation_S = -45°$, ...) |
| 100% | (..., $rotation_S = 0.0°$, ...) |

By traversing through this pathway whenever the application should display the Settings Focus mode, it is guaranteed that the same animation rotation will always display for the latter 50% of the animation regardless of the view's original state. That is, the Settings may originally be at any rotation amount, for example 90°, and traversing the pathway would provide an interpolation from 90° to 45° for the first 50% of the animation, interpolating from 45° to −45° for the next 25% of the animation, then finally interpolating from −45° to 0° for the remaining 25%. The starting configuration point representing the onscreen display can converge to the pathway's final coordinate.

Null and Pin Values

The system includes the ability to use null (Ø) and pin (Π) values to create more flexibility in pathway descriptions, using context-dependent rules to determine the pathway being traversed. For example, in the Settings Focus pathway, the user wants the alpha value to be 1.0 by the end of the animation (100%) and is otherwise unconcerned with its value before 100%. That is, the user wants the alpha value to continuously animate from its starting value to 1.0 over the entirety of the animation.

In the Settings Focus pathway, the system requires the user to provide alpha values at 50%, 75%, and 100% as follows:

| Percentage | Configuration Waypoint |
|---|---|
| 50% | (..., $alpha_S$ = _, $rotation_S$ = 45°, ...) |
| 75% | (..., $alpha_S$ = _, $rotation_S$ = −45°, ...) |
| 100% | (..., $alpha_S$ = 1.0, $rotation_S$ = 0.0°, ...) |

However, in some cases, providing numbers for the required $alpha_S$ values cannot provide the continuous interpolation desired: the system can only interpolate from the starting value up to the value at 50%, then the remaining alpha animation would always be fixed to interpolate between hard-coded alpha values.

Instead, the system can allow for more relative pathway descriptions. A null value (Ø) indicates that the configuration waypoint's animatable property value will be calculated as a linear interpolation of the nearest animatable property number values in the pathway (including the starting point's animatable property value).

To achieve the continuous alpha, animation to 100% mentioned in this example, the requisite alpha values can be set to Ø:

| Percentage | Configuration Waypoint |
|---|---|
| 50% | (..., $alpha_S$ = Ø, $rotation_S$ = 45°, ...) |
| 75% | (..., $alpha_S$ = Ø, $rotation_S$ = −45°, ...) |
| 100% | (..., $alpha_S$ = 1.0, $rotation_S$ = 0.0°, ...) |

Now, whenever this pathway is traversed, the system first captures the starting value, for example alpha=0.2 (at 0%):

| Percentage | Uncalculated Configuration Waypoint |
|---|---|
| 0% | (..., $alpha_S$ = 0.2, $rotation_S$ = 90°, ...) |
| 50% | (..., $alpha_S$ = Ø, $rotation_S$ = 45°, ...) |
| 75% | (..., $alpha_S$ = Ø, $rotation_S$ = −45°, ...) |
| 100% | (..., $alpha_S$ = 1.0, $rotation_S$ = 0.0°, ...) |

Next, the system calculates the replacement numbers for all null values based on their correlated percentage values:

| Percentage | Calculated Configuration Waypoint |
|---|---|
| 0% | (..., $alpha_S$ = 0.2, $rotation_S$ = 90°, ...) |
| 50% | (..., $alpha_S$ = 0.6, $rotation_S$ = 45°, ...) |
| 75% | (..., $alpha_S$ = 0.8, $rotation_S$ = −45°, ...) |
| 100% | (..., $alpha_S$ = 1.0, $rotation_S$ = 0.0°, ...) |

Finally, the system interpolates through the resulting values to achieve the desired animation. Thus, the system determines that the alpha values at 50% and 75% are 0.6 and 0.8, respectively.

The Settings Focus pathway includes the configuration parameters for the Settings, List, and article Details views. For the List and Details views, the user may wish to dictate only some animatable property values and leave others unmodified. This can provide the user with greater freedom of traversal and of user interface metaphors, since the user is not required to define all elements' property changes.

For example, if there are no new articles available and all existing articles have been read, perhaps the article list view L would always be displayed at 50% opacity (alphaL=0.5). Currently, the Settings Focus pathway dictates that $alpha_L$ ends at 0%. The user may therefore desire that, as the system transitions to the Settings screen from the List view, alphaL remains unchanged until the final 25% of the animation so as to maintain the "opacity amount" visual cue for as long as possible.

To achieve this, the system presents the user with another type of value to express relative pathways. A pin value (Π) indicates that the waypoint's animatable property value will be the value of the preceding animatable property number value in the pathway (including the starting point's animatable property value).

The Settings Focus pathway can be extended as follows:

| Percentage | Uncalculated Configuration Waypoint |
|---|---|
| 50% | (..., $alpha_S$ = Ø, $rotation_S$ = 45°, ..., $alpha_L$ = Π, ...) |
| 75% | (..., $alpha_S$ = Ø, $rotation_S$ = −45°, ..., $alpha_L$ = Π, ...) |
| 100% | (..., $alpha_S$ = 1.0, $rotation_S$ = 0.0°, ..., $alpha_L$ = 0.0, ...) |

Calculate with starting value:

| Percentage | Calculated Configuration Waypoint |
|---|---|
| 0% | (..., $alpha_S$ = 0.2, $rotation_S$ = 90°, ..., $alpha_L$ = 0.4, ...) |
| 50% | (..., $alpha_S$ = 0.6, $rotation_S$ = 45°, ..., $alpha_L$ = 0.4, ...) |
| 75% | (..., $alpha_S$ = 0.8, $rotation_S$ = −45°, ..., $alpha_L$ = 0.4, ...) |
| 100% | (..., $alpha_S$ = 1.0, $rotation_S$ = 0.0°, ..., $alpha_L$ = 0.0, ...) |

As the system traverses through this pathway, alphaL can remain at 0.4 until 75% into the animation, at which point it will be interpolated from 0.4 to 0.0 for the remaining 25%.

To calculate trajectories for a pathway, each sequence of values for each dimension can be examined independently. When encountering a sub-sequence of null values in any dimensional sequence, the system first determines the immediately preceding calculated number value and immediately succeeding uncalculated non-null value. The system then calculates the linear interpolation for each null value given their waypoints' percentages and the aforementioned number values.

If no succeeding number value is found for a null subsequence, then either the null subsequence is at the end of the main sequence, or the immediately succeeding value is a pin value. The system can interpret both cases equally: each null value in the subsequence is taken as a pin value, and the resultant calculated value for each subsequence item can be the preceding calculated value.

Note that a null waypoint (i.e., a waypoint with a given percentage whose animatable property values are all null) can be equivalent to omitting a waypoint at that percentage in a pathway. The system can abbreviate pathways by allowing the developer (user) to define pathways without a waypoint at 100%. In such a case, it can be implied that there is a null waypoint at 100%, which the system interprets as "pinning" or carrying over the calculated values from the ending developer provided waypoint, since the system has effectively created a null sub-sequence with no succeeding number value for each dimension.

Types of Animation

Systems of the present disclosure can permit at least three general categories of animation, which can include incrementing through animation pathways: manual animations, jump animations, and automatic animations. A manual animation increments through pathways where the developer provides percentage amounts directly to the pathway, allowing for manual traversal through the pathway. This also allows for reversible traversal along the pathways, e.g., animating from 0% to 50%, then back to 40%, for example driven by a continued user swipe/pan gesture.

Before percentage updates are provided for a manual animation, the developer can first notify the system of which pathways will be manually traversed. This allows the system to perform a trajectory calculation from the current configuration point being displayed through the pathways' waypoints, thereby converting (Ø) and (Π) values to real configuration number values which may be used in animation interpolation calculations.

A jump animation is a discontinuous traversal from the current configuration point to the end result of traversing through a set of given pathways. A jump animation's implementation is to first notify the system that some given pathways will be manually traversed, then to notify the system to manually animate to 100%.

Under automatic animation, the system automatically increments through a traversal for a given period of time. Internally, the system includes custom timers which are synchronized to the screen refresh rate, and these timers are responsible for driving the traversal. Immediately before the timers begin, the automatic animation process also notifies the system that animations will soon begin, thereby providing trajectory calculations. More than one timer may be running simultaneously, but since they are all initialized during the same computation cycle and are all synchronized to the screen refresh rate, they may be effectively thought of as a single timer.

Various gains are provided by interpolating animations. The system can trivially interrupt and redirect pathway traversals, for example, and developers may manually control animations to tie them to non-deterministic processes. In addition, the system can accommodate fixed animations in addition to relative animations. To create an animation that always begins from the exact same starting configuration, the developer can construct a pathway with a waypoint at 0% whose animatable properties all have number values. Partially fixed animations may similarly be constructed where only some properties have number values in the 0% waypoint, e.g., ensuring that a particular animation will always begin at x=100 but is otherwise unconcerned with the starting values of the other parameters.

Simultaneous Animation Traversal

When defining animation pathways, the system can rely on configuration waypoints where each property may have a real number. If an animation pathway does not modify a property, that dimension will have a null value (Ø) for each configuration waypoint. If two animation pathways are orthogonal (i.e., if the dimensions a pathway modifies are mutually exclusive from the dimensions another pathway modifies), then the system is able to simultaneously traverse through both pathways or traverse through one pathway independently of another pathway. Concurrent traversal may be represented as the traversal of the addition of both pathways.

In an example, a configuration space for a single view has the following dimensions:

($x_v$, $y_v$, $alpha_v$, $rotation_v$)

The configuration space has the following pathways:

| Pathway 1 | |
|---|---|
| Percentage | Configuration Waypoint |
| 10% | (20, Ø, Ø, Ø) |
| 30% | (50, Ø, Ø, Ø) |

| Pathway 2 | |
|---|---|
| Percentage | Configuration Waypoint |
| 30% | (Ø, 80, Ø, Ø) |
| 80% | (Ø, 40, Ø, Ø) |

| Pathway 3 | |
|---|---|
| Percentage | Configuration Waypoint |
| 50% | (Ø, Π, 0.9, 0.0) |
| 100% | (15, Π, 1.0, 0.0) |

Because pathways 1 and 3 both define x-values, they may not be run simultaneously. Similarly, pathways 2 and 3 may not be traversed simultaneously since pathway 2 provides y-values whereas pathway 3 dictates that y-values should not change.

However, the system may run pathways 1 and 2 concurrently since they do not provide contradictory pathway instructions, i.e., they are orthogonal to one another. At 30%, the system merges the x and y values of pathways 1 and 2. The resultant pathway would be defined as:

| Percentage | Configuration Waypoint |
|---|---|
| 10% | (20, Ø, Ø, Ø) |
| 30% | (50, 80, Ø, Ø) |
| 80% | (Ø, 40, Ø, Ø) |

The resultant behavior of traversing through this pathway is equivalent to the effect of simultaneously traversing through pathways 1 and 2. The null (Ø) x-value at 80% means that, after 30%, the x-values will be pinned at 50, just as pathway 1 indicates. The null (Ø) y-value at 10% indicates that, during runtime (or upon execution), the system will linearly interpolate the y-value from its starting value to 80 from 0% to 30%, just as pathway 2 indicates.

Subspaces

Using null and pin values, systems of the present disclosure are capable of stratifying a configuration point into multiple partial points using any desired or otherwise predetermined combination, thus allowing for more creative freedom and powerful UI and navigation paradigms. In an example with a label L and button B, a configuration space has the following dimension:

($x_L$, $Y_L$, $alpha_L$, $rotation_L$, $x_B$, $y_B$, $alpha_B$, $rotation_B$)

Consider the configuration point:

p=(20, 50, 1.0, 0.0°, 100, 20, 0.5, 90°)

The system can stratify this point into two partial points, one representing only the label values and the other only the button values:

p=(20, 50, 1.0, 0.0°, Ø, Ø, Ø, Ø)+(Ø, Ø, Ø, Ø, 100, 20, 0.5, 90°)

Alternatively, the system can stratify the point into three partials, one focusing on all the alpha values, another on all rotations, and a third for all remaining values:

p=(Ø, Ø, 1.0, Ø, Ø, Ø, 0.5, Ø)+(Ø, Ø, Ø, 0.0°, Ø, Ø, Ø, 90°)+(20, 50, Ø, Ø, 100, 20, Ø, Ø)

Thus, dimensions of a given point may be separated and rendered independently of one another.

Such stratification can be extended to animation pathways. For example, a pathway may be set up to animate only a particular property of a particular view regardless of other views and properties. By stratifying animation pathways, the system can provide greater independence of specific visual effects, thereby allowing a user to mix and match pathways as desired. For brevity, a pathway may be represented with only a subset of all animatable property value columns—any omitted property value column may be assumed to be filled with null values.

In an example, the news app's user interface can be extended using pathway stratification. The news app includes at least three pathways: a pathway for focusing on the List view L, a pathway for focusing on the Details view D, and a pathway for focusing on the Settings view S. In an implementation, the system can tightly couple the animations for unfocusing views along with the focus animation, since the system would have to put all values for all views in a configuration point. This may force the system to duplicate animatable property values in multiple pathways if the same effect for a view is desired whenever it is unfocused. If a user wishes to have different possible unfocus animations for a view depending on some application condition, the user may make a pathway for every possible combination.

As an alternative implementation, the user can stratify the news app into three sets of dimensions, one each for L, D, and S. Then for each view, the user can construct both a focused and unfocused pathway as follows:

| L dimensions: $(x_L, y_L, alpha_L, rotation_L, scale_L)$ | |
|---|---|
| Percentage | Configuration Waypoint |
| | $L_{Unfocused}$ |
| 100% | ( . . . ) |
| | $L_{Focused}$ |
| 100% | ( . . . ) |

| D dimensions: D dimensions: $(x_D, y_D, alpha_D, rotation_D, scale_D)$ | |
|---|---|
| Percentage | Configuration Waypoint |
| | $D_{Unfocused}$ |
| 100% | ( . . . ) |
| | $D_{Focused}$ |
| 100% | ( . . . ) |

| S dimensions: $(x_S, y_S, alpha_S, rotation_S, scale_S)$ | |
|---|---|
| Percentage | Configuration Waypoint |
| | $S_{Unfocused}$ |
| 100% | ( . . . ) |
| | $S_{Focused}$ |
| 100% | ( . . . ) |

If the user wishes to focus on the details view, the user can conglomerate $D_{Focused}$, $L_{Unfocused}$, and $S_{Unfocused}$ into a single pathway, then traverse through that pathway.

Using composable pathways, the user may now encode information about application state directly into the user interface configuration and animations. For example, if the user is viewing the Details of a news article and there are still unread articles in the List, the system can display a miniaturized rendition of the List view. If there are no unread articles, then the Details view can encompass the entire screen and the List view can be entirely hidden alongside the Details view. In both cases, the Settings view can remain entirely hidden.

To achieve this, specialized pathways may be created for the List and Details views:

$L_{PartiallyUnfocused}$
$L_{CompletelyUnfocused}$
$L_{Focused}$
$D_{PartiallyFocused}$
$D_{CompletelyFocused}$
$D_{Unfocused}$
$S_{Focused}$
$S_{Unfocused}$ If there are unread articles and the application is focusing on the Details view, then the app can traverse as follows: $L_{PartiallyUnfocused}$, $D_{Partiallyfocused}$, $S_{Unfocused}$. If there are no unread articles and the user is focusing on the Details view, then the app can traverse as follows: $L_{CompletelyUnfocused}$, $D_{CompletelyFocused}$, $S_{Unfocused}$.

If an application has a large number of pathways, it may be convenient to group them into meaningful sets, e.g., grouping all pathways for a view into a set or grouping by application state. Such a grouping can create a subsection of the configuration space, that is, a subset of potential configurations. For this reason, a set of pathways may be referred to as a subspace of the configuration space.

Any subspaces created may be topologically disconnected. In some examples, the user can define a subspace that contains two fixed pathways altering the same dimension where the pathways' values do not overlap. For example, pathways A and B both animate the x dimension of the same UI element. Pathway A animates the closed value set [0-90] and pathway B animates the closed value set [110-250], as below. Any two subspaces created from pathway groupings may or may not be disjointed from one another, and they may or may not be mutually orthogonal. Defining a subspace to act on a certain element does not prevent the user from defining other subspaces to animate the same element differently.

| Pathway A | |
|---|---|
| Percentage | Configuration Waypoint |
| 10% | (x = 0) |
| 30% | (x = 90) |

| Pathway B | |
|---|---|
| Percentage | Configuration Waypoint |
| 0% | (x = 110) |
| 100% | (x = 250) |

By grouping pathways into subspaces, the user can focus on portions of animation behaviors independently of others. For example, if the opacity of a particular view may represent some piece of application functionality or state, the user may wish to manage the view's alpha value independently of other animatable properties in the user interface. So, the user can group all pathways for that view's alpha values into a subspace. The user can select pathways to traverse for a given application state from this subspace without concern for the rest of the user interface.

Superpathways

Subspaces can be imposed by pathway grouping. Systems of the present disclosure can concurrently traverse any combination of pathways within a subspace and/or across multiple subspaces so long as all selected pathways are mutually orthogonal. When an application state changes, each subspace may independently interpret this state change and provide one or more pathways to traverse so that the user interface may reflect the new state. The resultant summed pathway (or "superpathway"), may be thought of as the superposition of each "position" (correlated set of zero or more pathways in a subspace) in all subspaces for a given application state.

The ability to create subspaces which are mutually independent provides an advanced approach for configuration space traversal, that is, an advanced system of animation composition. The dimensional independence provided by decoupling pathways into separate, reusable components while simultaneously responding to the same application state change provides the user interface a visual effect where UI parameters may be altered completely independently of one another while still manifesting into a useful display configuration.

In an example, for the news app described herein, the stratification already mentioned may be formalized. There are three subspaces, one each for L, D, and S, and each subspace contains the following pathways:

Subspace L: PartiallyUnfocused, CompletelyUnfocused, Focused
Subspace D: PartiallyFocused, CompletelyFocused, Unfocused
Subspace S: Focused, Unfocused The news app has four common focus modes to which the application may configure. The following superpathways may be defined and recorded into the system for frequent reference.

| $List_{Focus}$ Superpathway: | |
| --- | --- |
| Subspace | Pathway |
| List | Focused |
| Details | Unfocused |
| Settings | Unfocused |

| $Details_{CompleteFocus}$ Superpathway: | |
| --- | --- |
| Subspace | Pathway |
| List | CompletelyUnfocused |
| Details | CompletelyFocused |
| Settings | Unfocused |

| $Details_{PartialFocus}$ Superpathway: | |
| --- | --- |
| Subspace | Pathway |
| List | PartiallyUnfocused |
| Details | PartiallyFocused |
| Settings | Unfocused |

| $Settings_{Focus}$ Superpathway: | |
| --- | --- |
| Subspace | Pathway |
| List | CompletelyUnfocused |
| Details | Unfocused |
| Settings | Focused |

Systems of the present disclosure, including user interfaces, can be designed to be used as minimally or maximally as desired. If a user (e.g., developer) wishes to use animation pathways directly and provide a custom system for pathway management, the AnimationPathway's API allows for more manual control. If pathway coordination is desired but multiple subspace management is unnecessary, the developer can directly utilize the AnimationPathwayCoordinator object.

The SPC can manage multiple subspaces and also allow the developer at least two approaches for determining which superpathways to traverse. At any given time, the developer can specify any combination of pathways from any number of managed subspaces as the superpathway to traverse. In addition, if certain superpathways are expected to be traversed often, the SPC can keep record of any pre-defined superpathways. In such a case, the developer may only need to specify a pre-defined superpathway's identifier for the system to traverse through.

Visual Effects

Systems of the present disclosure can enable and aid in the creation of various visual effects, examples of which will be described below (along with details about the system's implementation).

Relative Velocities

By interpreting animations as the result of configuration space traversal, the effects of a system of the present disclosure can be viewed from a kinematics perspective in order to illustrate various visual consequences of the system. Due to the use of waypoints to ensure certain parameter values at certain percentage points in a sequence, the "relative velocity" of the parameter can be defined. When a pathway is being traversed, a chosen (or selected) animatable property's relative velocity for a given percentage can be defined as:

$$v = \frac{a_2 - a_1}{p_2 - p_1}$$

where $a_1$ and $p_1$ are the parameter value and percentage value of the given percentage's preceding waypoint, respectively, and $a_2$ and $p_2$ are the parameter value and percentage value of the given percentage's succeeding waypoint, respectively. If $p_1 = p_2$, the relative velocity is set to zero.

Velocity can be calculated for any two consecutive points. If the velocity is not constant with percentage, then the velocity can be calculated for a given animation pathway and used to generate a velocity function which can be a function of percentage. The velocity function can be used to generate an acceleration function that is a function of percentage.

While traditional velocities are measured as distance traveled per unit of time, relative velocity is the measurement of change in parameter unit (or value) per percentage. Animations can be decoupled from progression of time, providing the system with the ability to have non-zero acceleration for the animation's progression and move either forwards of backwards in a pathway while still retaining a rate of parameter change independent of percentage acceleration (i.e., dv/dp).

Consider the following pathway:

| Percentage | Configuration Waypoint |
|---|---|
| 30% | (x = 80) |
| 60% | (x = 150) |

We can calculate the relative velocity at any percentage point between two waypoints. At 50%, the x-position's relative velocity is:

$$v = \frac{150-80}{60-30} = \frac{70}{30} \approx 2.33 \text{ x-units/percentage point}$$

The system can be conveniently (given the composability of pathways) used to control the apparent speed of a UI element's change in parameter values by changing the duration of an automatic animation. For example, using the pathway defined above and setting the duration of the animation to 10 seconds can create an absolute dimensional velocity of 23.3 x units/s, while setting the animation duration to 50 seconds can create an apparent velocity of 4.66 x-units/s as follows:

$$\frac{2.33 \text{ x-units}}{\text{percentage point}} * \frac{100 \text{ percentage points}}{10 \text{ seconds}} = \text{Animation 1}$$

23.3 x-units/second $$\frac{2.33 \text{ x-units}}{\text{percentage point}} * \frac{100 \text{ percentage points}}{50 \text{ seconds}} = \text{Animation 2}$$

4.66 x-units/second

Simultaneously automatically animating two pathways with different relative velocities can create various UI metaphors or effects. For example, when simultaneously animated at any duration, view A (v=2 x-units/percentage) can appear to move slower than view B (v=4 xunits/percentage). Importantly, the velocity relationship between the two UI elements can be preserved regardless of the duration of animation. Such visual relationships are useful for conveying a variety of metaphors, such as greater urgency of a particular UI element's data, or a hierarchical or associative relationship between UI elements.

Relative velocities may be employed when using manual animations because they are driven by non-deterministic input, such as user gestures. Therefore, the ability to partially decouple the percentage of animation sequence completed from rate of parameter change can lead to more detailed variation in animation appearance.

In an example, a waypoint value in a pathway that is other than what would be expected from an assumed constant velocity can be set as follows:

| Percentage | Configuration Waypoint |
|---|---|
| 30% | (x = 80) |
| 60% | (x = 150) |
| 90% | (x = 160) |

This effectively divides the animation sequence into two segments, a first segment (30%, 60%) and second segment (60%, 90%), with two different relative velocities. A relationship can be established between the two segments of the animation. The second segment can animate at a lower rate than the first segment. The manual animation can be animated over a time period that is driven, for example, by user gesture upon execution. The UI effect can be implemented regardless of the duration of the animation.

Using both relative velocities and manual animations, input can be insulated from apparent effect. Establishing an indirect mapping between user input and change in parameter values provides the opportunity to create a variety of metaphors.

For example, a user can create a UI in which certain elements, controlled by a swipe gesture for example, give the impression of being slow to respond to user input until a certain threshold has been met, at which point the elements' response may overcompensate for their earlier reluctance.

No matter how quickly the user accelerates during a given interval (e.g., 0% to 50%), the overall effect of motion being impeded is preserved. Note that this relationship can hold true even when the pathway is manually animated in reverse. This can be done by defining a pathway with a waypoint that establishes a slower relative velocity for the beginning of any animation and a faster relative velocity for the rest of the animation, as illustrated in the following example:

| Percentage | Configuration Waypoint |
|---|---|
| 0% | (x = 80) |
| 50% | (x = 90) |
| 90% | (x = 200) |

Ornamentation

Systems of the present disclosure can be programmed to enable a user to readily define granular ornamentations per pathway, since this allows the user to deal with particular parameters of a chosen view in isolation. Even when animation pathways have been previously defined to consider multiple parameters, parameters can be split out into stratified pathways if so desired. From this flexibility, a system can be used to ensure uniqueness of look and feel for individual pathways despite simultaneity of animation.

Specific animation ornamentations can create hallmark visual animations per view. For example, a user can ensure that a Details view always bounces when it enters or exits a screen. Characteristic animations such as this can be helpful in identifying a view's purpose, making an app faster to use and even making an app's navigation and functionality depend less on textual instructions and labels.

Similarly, hallmark visual animation cues or transitions can be created to easily denote certain application states regardless of view. For example, any view that needs the user's attention can be made to display a characteristic signal for attention by composing an animation pathway to display a generic "shake". As another example, any view that is transitioning to prominence on screen can be shown to animate through a characteristic fullscreen zoom-in animation by the same mechanism.

Interoperability Guidelines Between UI Elements

Systems of the present disclosure allow for the definition of pathways that serve as interoperability guidelines between UI elements, which can help ensure that UI elements do not conflict with each other. In an example, view A is positioned mostly offscreen (e.g., with only its lower half visible at the top of the screen) and can be pulled down toward the middle of the screen to make it the focus of the application. However, view B is currently in the middle of the screen, so it may be desirable to animate view B offscreen before allowing view A to begin its descent in order to prevent overlap and to emphasize that each view represents a mutually exclusive mode of the application.

This scenario can be implemented in at least two approaches. One approach is to animate the two views downwards in a lockstep fashion, creating the effect of panning the camera over a fixed landscape to focus on view A. Another approach is to animate both views downward, but not in lockstep, such as with distinct relative velocities.

There may be issues associated with animating two UI elements with different velocities. For instance, a problem may occur where if view A is animated faster than view B, view A might undesirably overlap with view B. Systems of the present disclosure can be programmed or otherwise configured to overcome such issues. A system of the present disclosure can accomplish animating with different relative velocities while providing an approach for dictating when and if overlaps occur during an animation sequence. In an example, two pathways with dimensions (x, y) are animating simultaneously (note the use of pin values):

| Pathway A (View A Entrance) | |
|---|---|
| Percentage | Configuration Waypoint |
| 50% | (Ø, Π) |
| 100% | (Ø, 240) |

| Pathway B (View B Dismissal) | |
|---|---|
| Percentage | Configuration Waypoint |
| 50% | (Ø, −200) |

The pin value will not allow view A to move downwards until more than 50% of the animation sequence has been completed, at which point it then interpolates from its current position to the middle of the screen (y=240). This allows View B to exit the screen without risk of the two views overlapping, even if view A has a faster relative velocity. View B immediately begins to animate at the beginning of the sequence and is offscreen by the 50% mark of the animation sequence. It should be noted that this relationship can hold true whenever a user wishes for any view to transition to view A, such as, for example, by configuring the UI such that the exiting view is dismissed by 50% completion.

This technique advantageously enables a user to create an animation pathway that allows the user to define certain guidelines of interoperability between UI elements. These guidelines can hold true for a variety of visual states per element and save the developer from having to define a full animation sequence for every possible interaction between various UI elements in their various states. For example, if a view can be expanded to various sizes, it can be made to avoid overlap without having to redo animation pathways for each size of that view, since the system can ensure that the dismissed view will exit before 50% and the arriving view will only come in once that view is dismissed after 50%.

The system can also handle more granular control of timing (e.g., beyond segmenting the animation into non-overlapping sections). For example, the user can define pathways as follows:

| Pathway A (View A Entrance) | |
|---|---|
| Percentage | Configuration Waypoint |
| 60% | (Ø, Π) |
| 100% | (Ø, 240) |

| Pathway B (View B Dismissal) | |
|---|---|
| Percentage | Configuration Waypoint |
| 50% | (Ø, −50) |

The above example can leave a gap of time from 50% to 60% in which no UI element is moving onscreen. The user can also configure an animation in which simultaneous movement occurs for a portion of the animation:

| Pathway A (View A Entrance) | |
|---|---|
| Percentage | Configuration Waypoint |
| 40% | (Ø, Π) |
| 100% | (Ø, 240) |

| Pathway B (View B Dismissal) | |
|---|---|
| Percentage | Configuration Waypoint |
| 50% | (Ø, −50) |

From 40% to 50%, both elements will simultaneously animate. In this example, overlap may occur depending on the size of the UI elements involved.

Overall User Experience Effects

Systems of the present disclosure can provide a futuristic coalescence UI effect. Any two or more pathways simultaneously traversed need not be in lockstep with one another, e.g., pathways 1 through 3 may have waypoints at 60% and at 85%, whereas pathway 4 may have a waypoint only at 10% (see below), meaning that pathway 4 only alters its visual appearance during the beginning of the animation sequence. This arrangement can be useful when, for example, a central indicator widget, animated by pathway 4, signals the beginning of a state change. Other ancillary widgets, animated by pathways 1 through 3, can animate to signify the progression through their related state changes up through 60%, followed by a signal denoting the completion of their state changes from 60-85%.

| Pathway 1 | |
|---|---|
| Percentage | Configuration Waypoint |
| 60% | (x = 80, y = 80) |
| 85% | (x = 80, y = 160) |

| Pathway 2 | |
|---|---|
| Percentage | Configuration Waypoint |
| 60% | (x = 300, y = 70) |
| 85% | (x = 300, y = 140) |

| Pathway 3 | |
|---|---|
| Percentage | Configuration Waypoint |
| 60% | (x = 0, y = 400) |
| 85% | (x = 0, y = 300) |

| Pathway 4 | |
|---|---|
| Percentage | Configuration Waypoint |
| 10% | (alpha = 0.5) |

Simultaneously traversing through such pathways can provide that, though each pathway is animating a set of parameters fully independently of any other pathway, the visual effect is that the UI element in each pathway smoothly converges to a desired final configuration while also completing its own compartmentalized function. This coalescence effect is possible because all pathways are synchronously traversed, thereby ensuring that all pathways will arrive at their destination states, 100%, at the same time. This can also be made possible by the fact that the system decouples the progress of animation sequences from animation pathway definitions, thereby allowing the system to trivially align any combination of pathways.

Some effects of the system can make an app feel more responsive to the user, creating a better user experience. For example, the user is allowed to manually drive any animations managed by the system if so desired by the user (e.g., developer), providing an interactive experience beyond being limited to watching animations that are triggered by relatively indirect input such as button or screen taps. Powerfully, simple gestures or other non-deterministic input can be made to act on even disparate UI elements, such as a swipe gesture sending away all widgets onscreen. Combined with the aforementioned hallmark visual identities, each widget may be sent offscreen with a unique animation, though all pathways are traversed concurrently.

The coexistence of manual and automatic animations in the system can lead to various visual and user experience effects. UIs made with standard techniques appear as if they are on rails, typically requiring animations to run to completion before triggering new animations, canceling actions, or reversing animations to navigate backwards. Systems of the present disclosure advantageously allow the user to interchangeably use automatic or manual animations. So, a user may override an automatic animation with a manual one at any time, allowing the user to interrupt and reverse or manually complete animations mid-transition. The user can even reroute the interrupted animation (e.g., to navigate to a new state) without waiting for the original sequence to complete.

Another effect is that the system may readily handle incomplete manual gestures by allowing automatic animations to activate if manual driving of an animation is abandoned. For example, a view driven by a manual gesture can be made to animate back to the starting location if the gesture does not reach a certain threshold, such as, e.g., 50%, and can be made to animate to completion if the gesture surpasses that threshold but does not reach a completion state.

Anthropomorphization, or "personality", of a user interface and its elements can be readily conveyed through the use of features described herein, such as characteristic visual identities and subtle stylistic gradations of responsiveness to user input. For example, a "sociable" widget that conveys invitations from contacts or that is made for children, can animate in a "friendly" manner, with bouncier movement. In contrast, a widget that is made to alert a user to incoming bad weather can animate with "severity," using slow, rolling, and dramatic movements. More subtly, different animation pathways can be defined for the same view to express different "emotional" states, such as an animation for an inbox view that conveys happiness for an empty inbox and sadness for a problem with internet connectivity.

UI Paradigms

Systems of the present disclosure enable an application to forego typical navigation structures, such as menus and back buttons, which are usually necessary to reduce the complexity that would arise from having to plan the look and feel of each entrance and exit of various views or modes. A system of the present disclosure can make it convenient to make changes in UI element functionality that conveys certain UI metaphors. For example, an app that opens to view A with functionality to show the current weather can animate the view to shrink and move to the bottom of the screen based on specific user input. In its minimized state, view A can then serve as the symbol to navigate back to a full screen view A.

Faster Design and Implementation Iteration

The composability of systems herein lends itself to an iterative process. Animations can contain animations objects that can be worked with directly by users. Furthermore, because a system can run these animations in parallel, it is substantially simple to manage a vast array of combinations of effects. Importantly, animations run in parallel finish at the same time, so developers can advantageously concentrate more on the content or effect of the animation and not on the timing of it. Systems of the present disclosure thus enable a user to decouple timing of a UI element (e.g., animation) from the content or effect of the UI element.

For example, a user can quickly prototype a complex UI composed of several elements, defining an animation pathway for each element and running those pathways simultaneously. As the users proceed to refine their ideas about how each element should look in relation to the others, the users need only change the parameters in the animation pathways affected without having to be concerned about the entirety of the UI. Similarly, if the users find an animation look of a view that they would like to use elsewhere, they may easily create the effect by composing its pathway with any orthogonal pathway.

Algorithms

Methods and systems of the present disclosure can be implemented by way of one or more algorithms. An algorithm can be implemented by way of software upon execution by one or more computer processors of a system, such as an electronic device of a user, as described herein. Algorithms of the present disclosure can be used in user interfaces upon execution by a computer processor. The user interfaces can be displayed on electronic displays.

Figure 4:
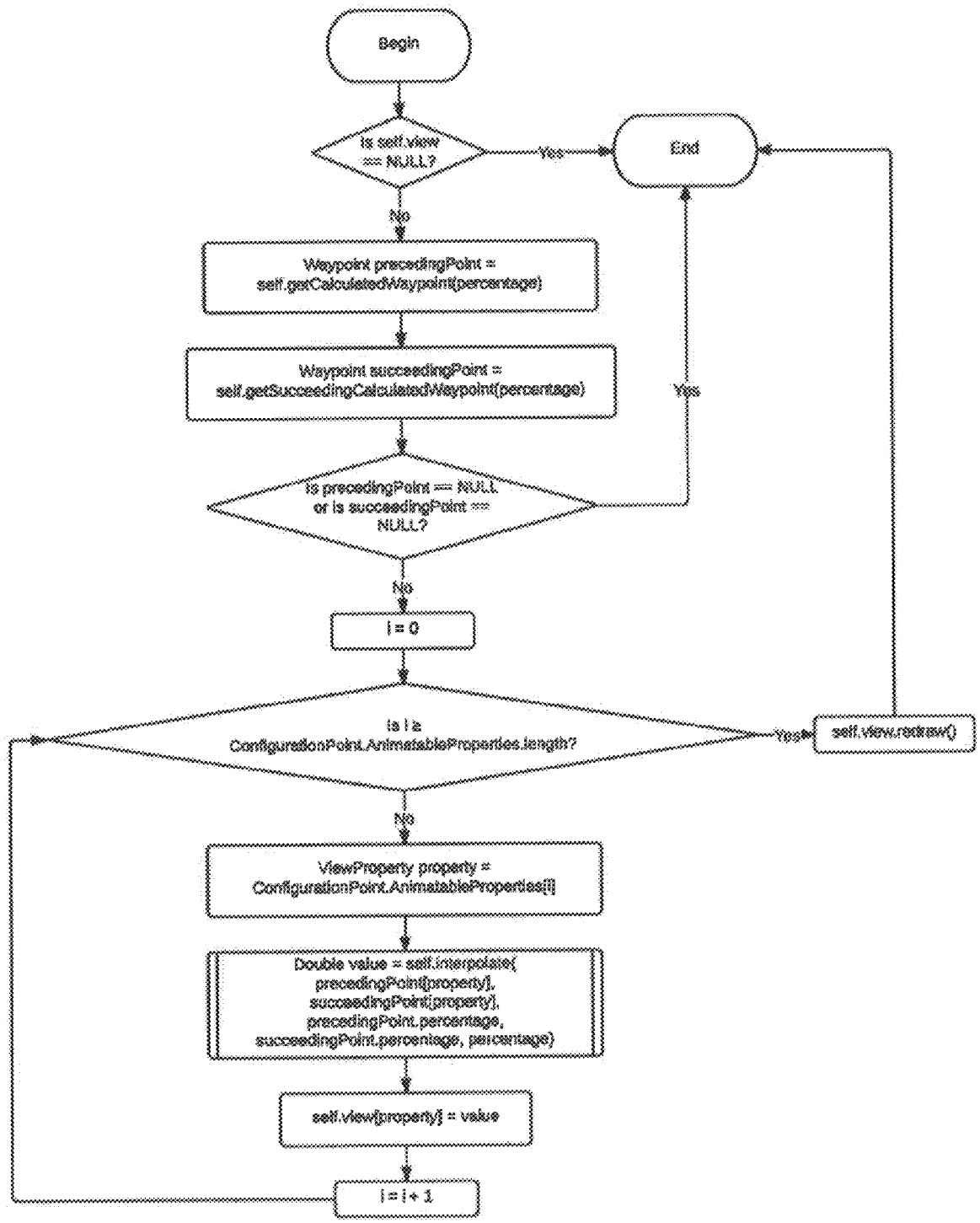
FIG. 4 shows an animation pathways algorithm in which preceding and succeeding waypoints are retrieved, and a current waypoint is interpolated for display as part of an animation.

FIG. 4 shows an animation pathways algorithm. In the illustrated algorithm, upon execution the system retrieves preceding and succeeding waypoints, and interpolates a current waypoint for display as part of an animation.

Figure 5:
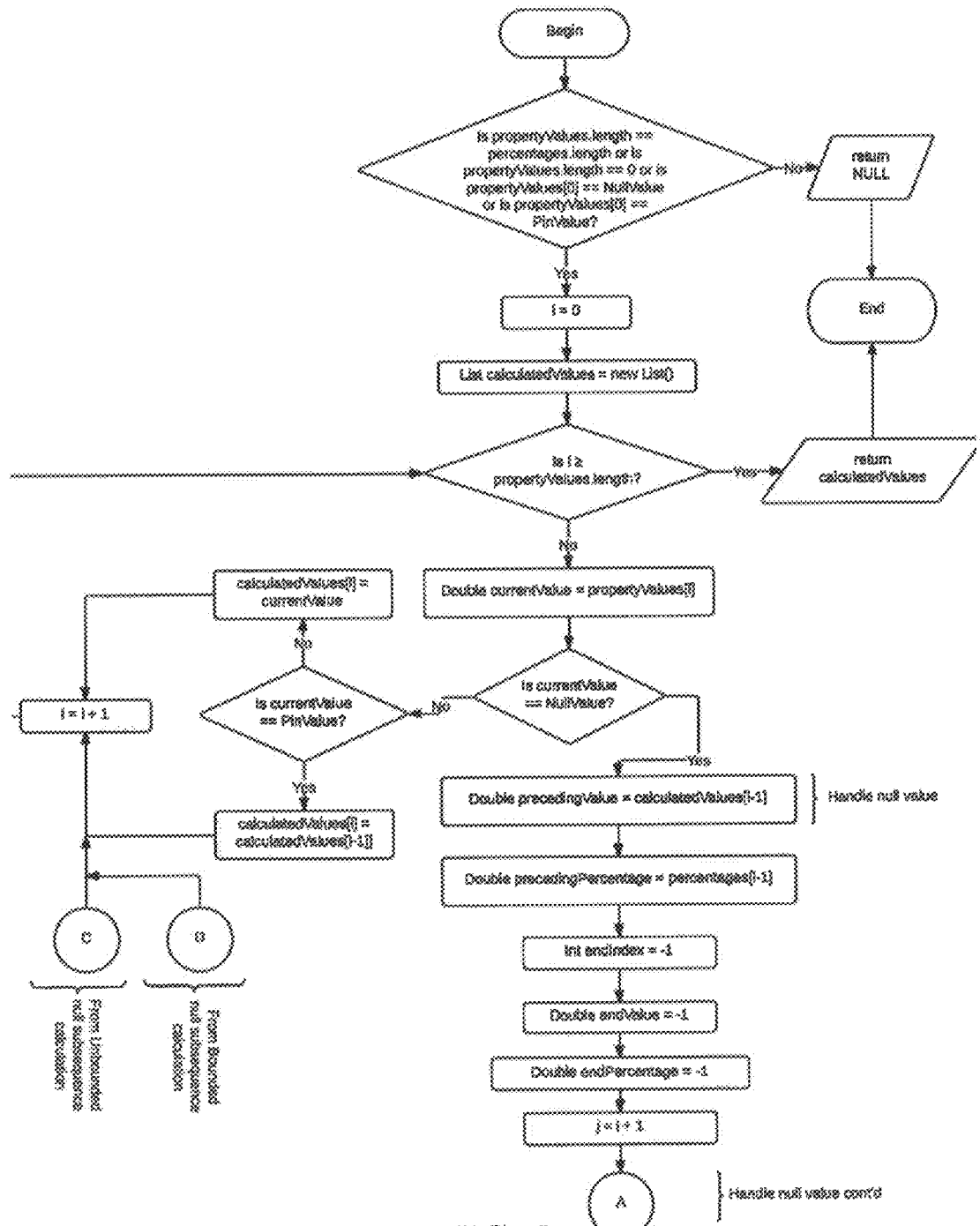
FIG. 5 shows another animation pathway algorithm.

FIG. 5 shows another animation pathways algorithm. In the illustrated algorithm, upon execution the system iterates through an ordered list of property values for a particular dimension, along with corresponding percentage values for when the property values should occur. The algorithm begins the process of calculating dimensional trajectories by handling pin values by duplicating the most recent calculated value and adding that to the calculated list. Real numbers can be copied into the calculated list. It also calls specific subroutines to convert null values in the original list into a list with all real numbers.

Figure 6:
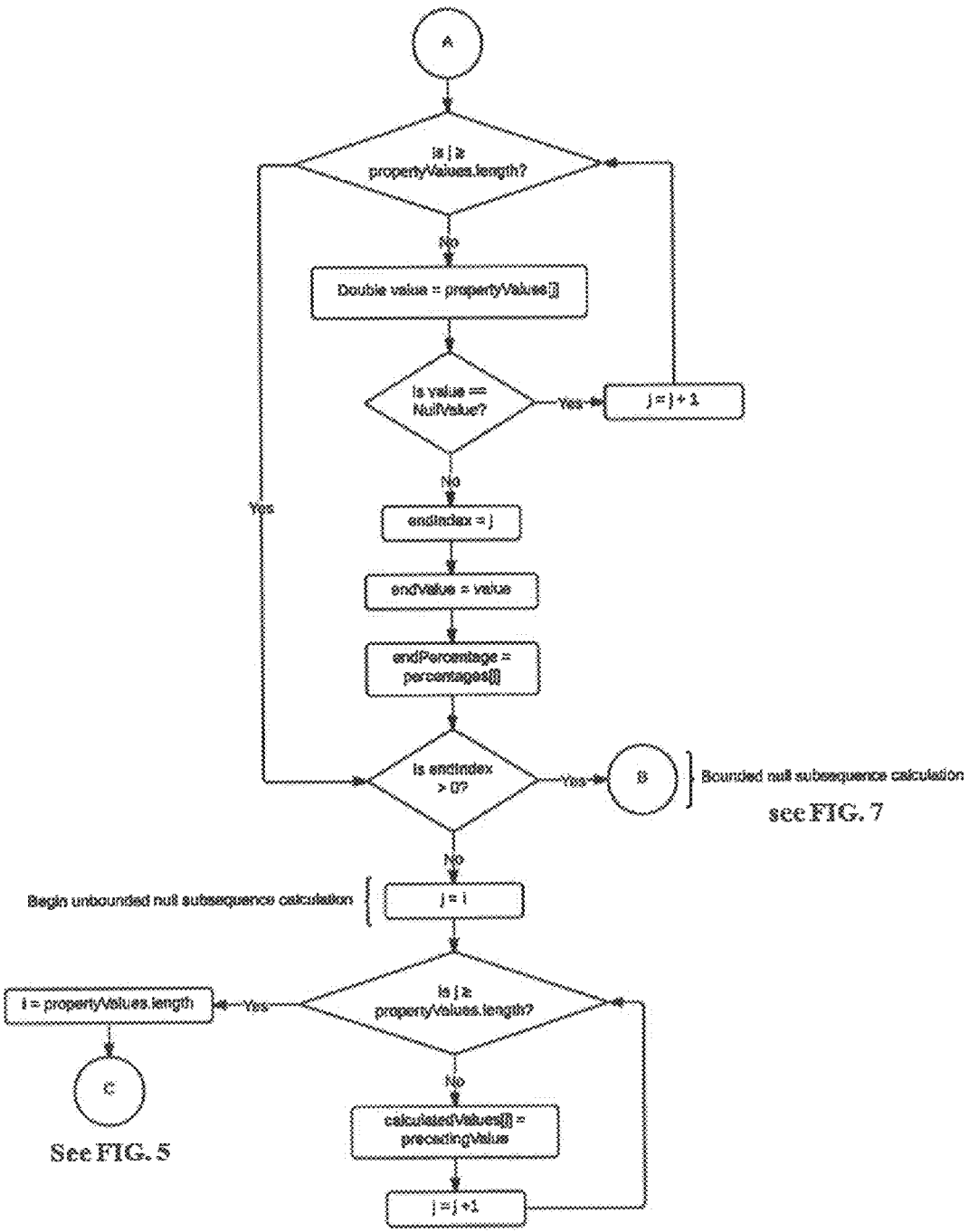
FIG. 6 shows another animation pathway algorithm.

FIG. 6 is a continuation of the algorithm shown in FIG. 5. This part of the algorithm handles the system's first encounter with a null value in the original list and proceeds to determine whether the null subsequence is unbounded or bounded. Unbounded null subsequences (i.e., those with no real or pin values after the first null value) can be processed as follows: the resultant calculated list can be populated with the real number that preceded this null subsequence. The system then fast forwards the main iteration shown in FIG. 5 to the end of the list, since there are no more calculations necessary.

Figure 7:
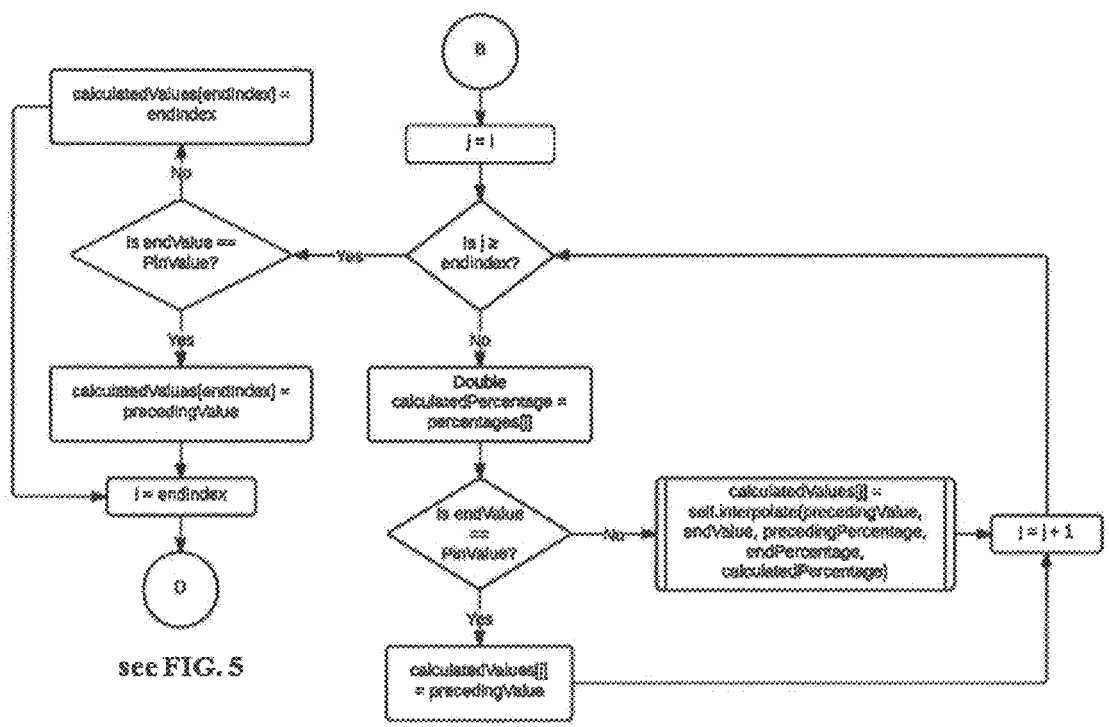
FIG. 7 shows another animation pathway algorithm.

FIG. 7 is a continuation of the algorithm shown in FIG. 5. This part of the algorithm converts a bounded null subsequence (i.e., one that has a real or pin value immediately after the null value) to real numbers. When bounded by a pin value, the system duplicates the last calculated value and adds it to the list for each null value in the null subsequence. When bounded by a real number, the system linearly interpolates from the last calculated value immediately preceding the null subsequence to the real number. The percentages associated with the two real values determine the "slope" of the trajectory, and percentages associated with each null value relative to their place in the subsequence are used to calculate the value for each null value. The iteration taking place in FIG. 5 is fast-forwarded past the bounded null subsequence.

Figure 8:
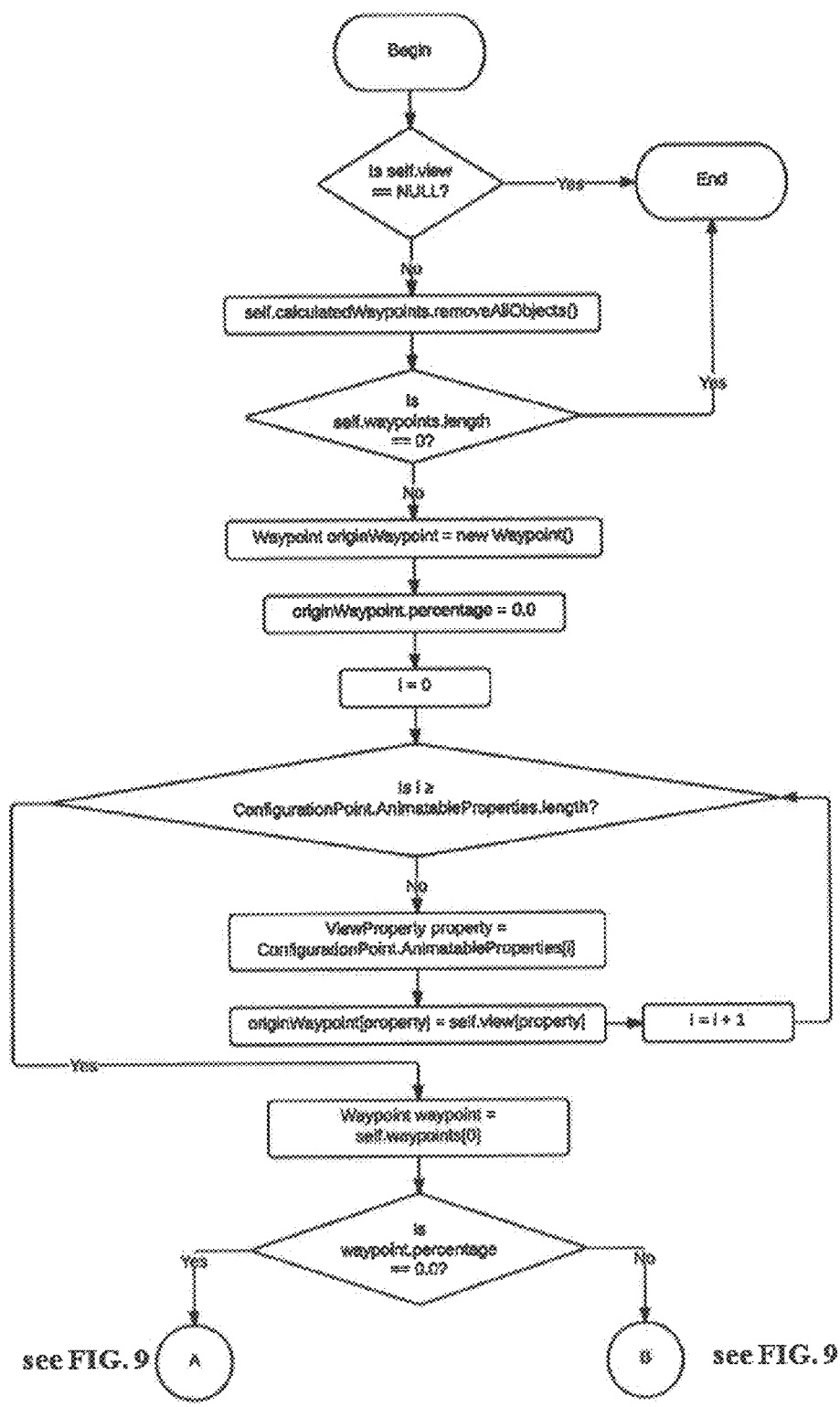
FIG. 8 shows another animation pathway algorithm.

FIG. 8 shows another animation pathways algorithm. In the illustrated algorithm, upon execution the system begins the process to create calculated waypoints by creating an origin waypoint for a pathway (which is the view's initial condition(s) as the traversal is about to begin).

Figure 9:
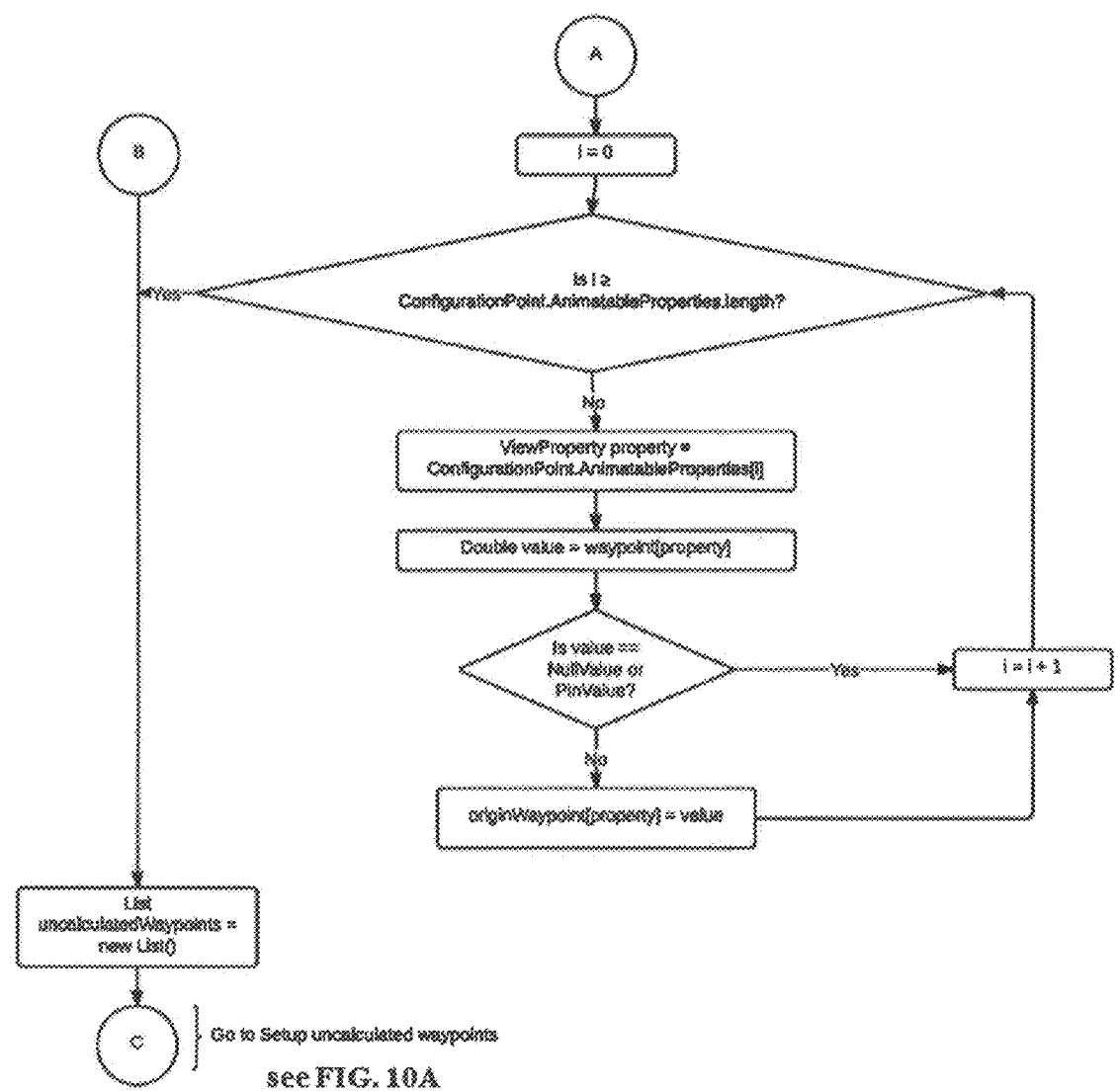
FIG. 9 shows another animation pathway algorithm.

FIG. 9 shows another animation pathways algorithm. In the illustrated algorithm, upon execution the system handles the case where the developer has created a pathway that contains a waypoint at zero percent, in which case it will override other origin values in favor of developer-provided values.

Figure 10A:
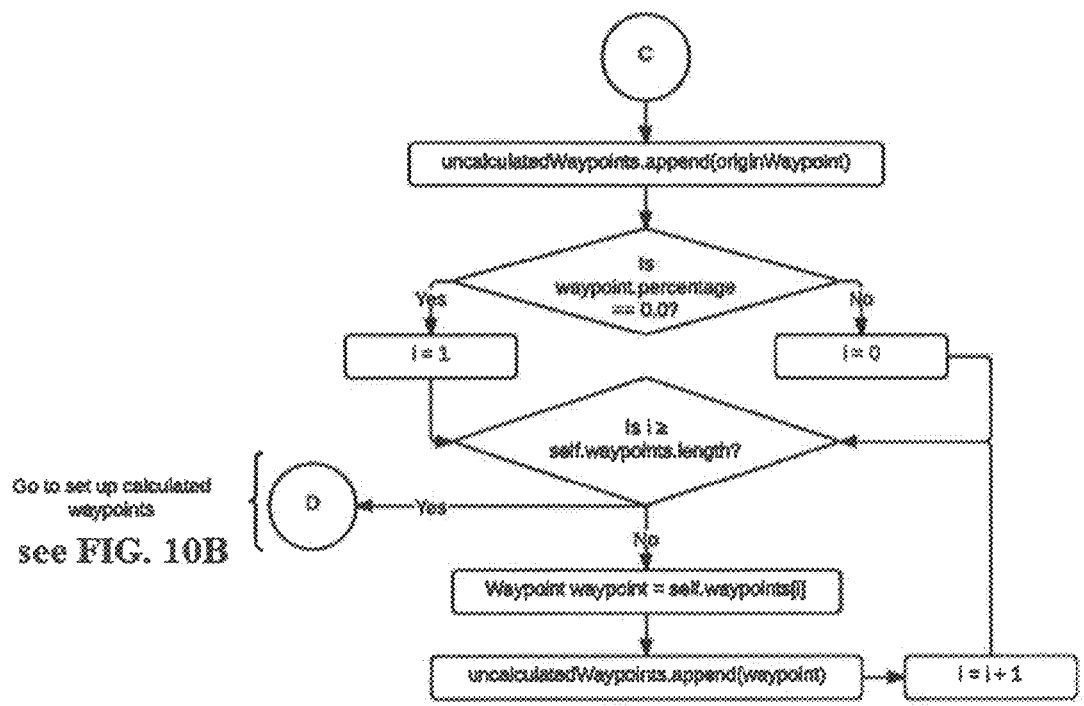
FIG. 10A shows an algorithm that can be used to generate uncalculated waypoints.
Figure 10B:
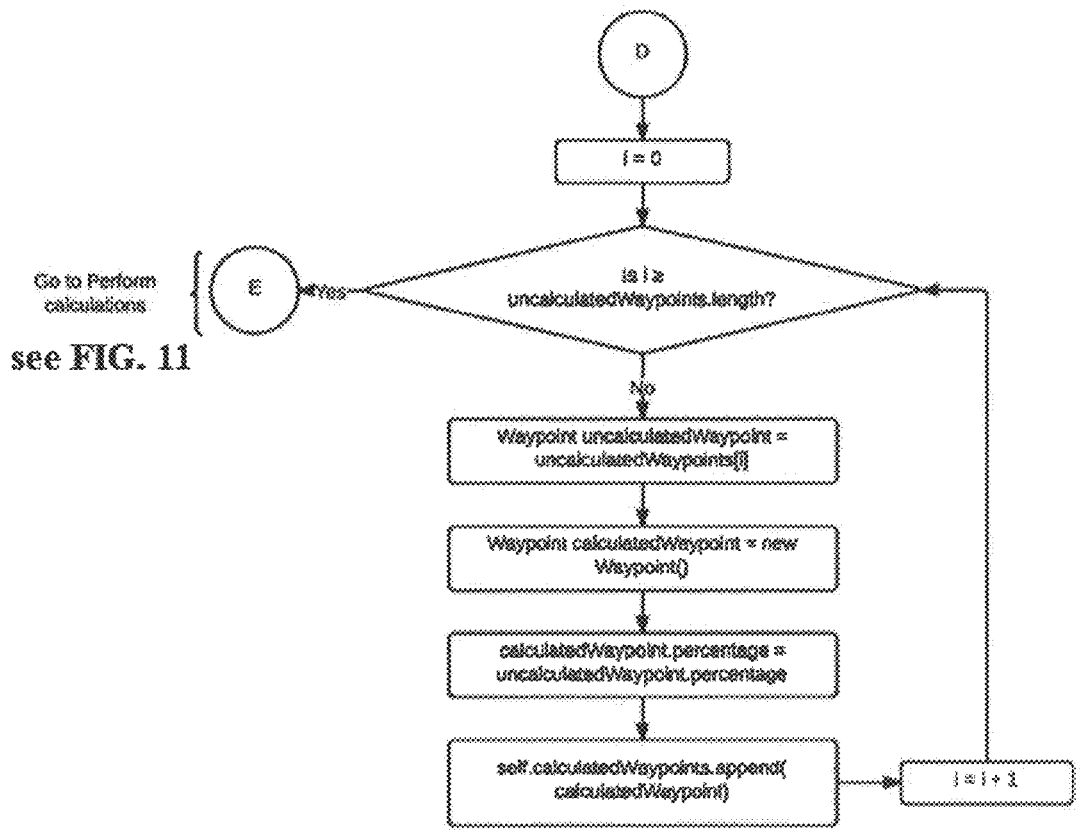
FIG. 10B shows an algorithm that can be used for to generate calculated waypoints.

FIGS. 10A-10B show other animation pathways algorithms. The algorithm in FIG. 10A creates a temporary list of uncalculated waypoints comprising of the origin waypoint from FIG. 8 as well as the developer-defined waypoints from the pathway (minus any developer-provided waypoint at zero percent). The algorithm in FIG. 10B can be used to create lists of calculated waypoints.

Figure 11:
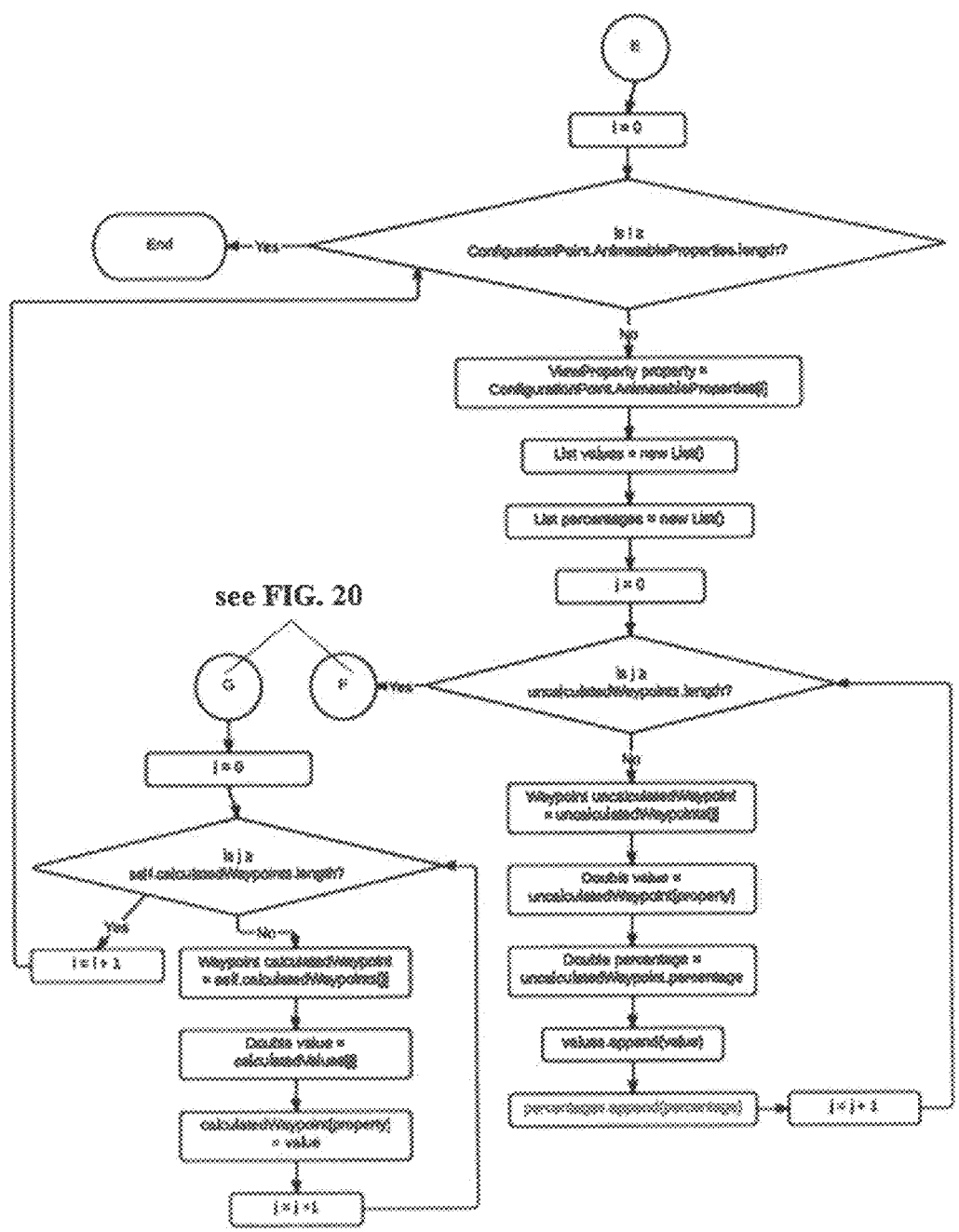
FIG. 11 shows another animation pathway algorithm.

FIG. 11 shows another animation pathways algorithm. In the illustrated algorithm, upon execution the system, for each dimension, creates a list of values along with a corresponding list of percentages to prepare for calculating the dimensional trajectory in FIG. 20. It can also be responsible for populating the waypoint containers from FIG. 10B using the calculated values from FIG. 20.

Figure 20:
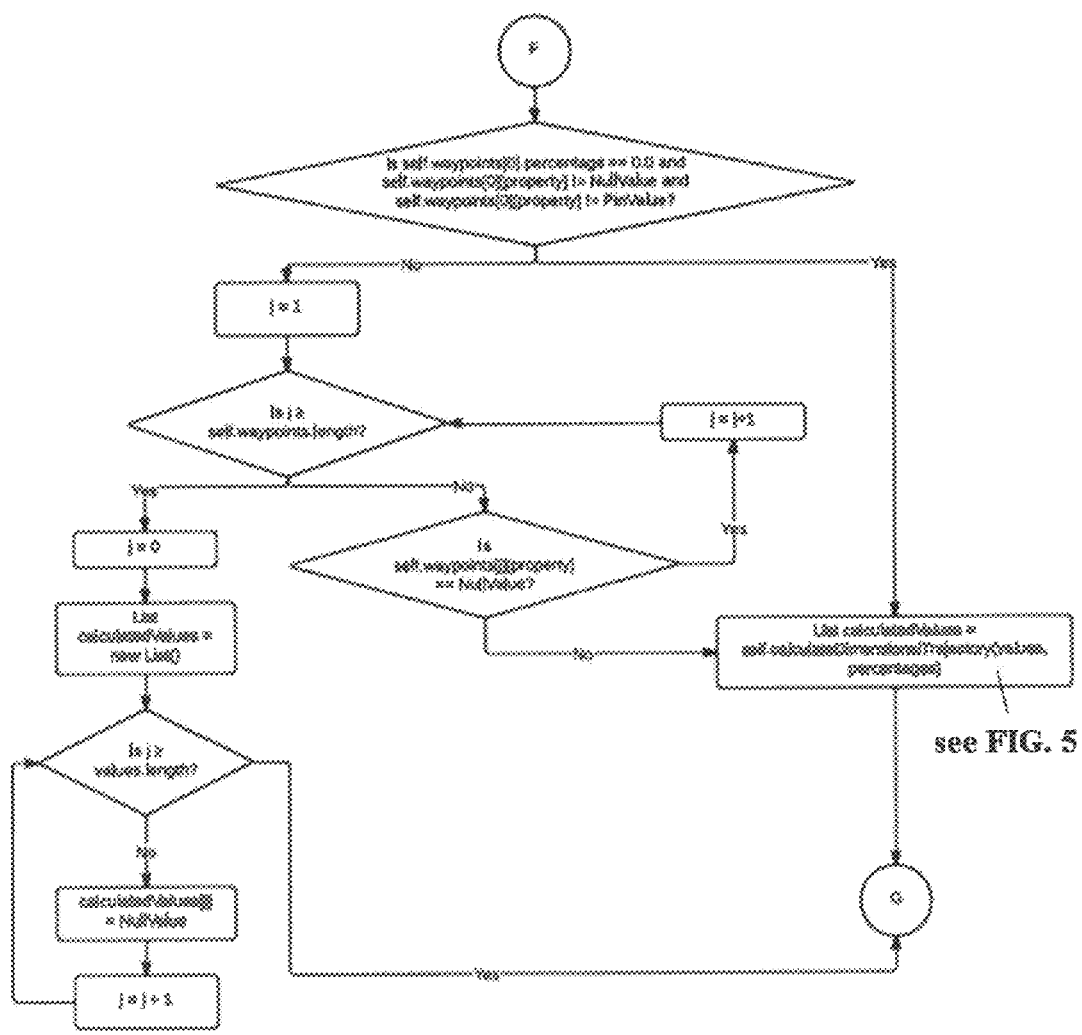
FIG. 20 is a continuation of the algorithm of FIG. 11.

FIG. 20 is a continuation of the algorithm initiated in FIG. 11. This part of the algorithm determines whether or not the user can calculate the trajectory for a dimension and perform the calculation if appropriate. Otherwise, the dimensional trajectory can be set to be comprises of all null values. By convention, if the user generates an origin waypoint for a pathway that contains a null dimensional value, then the system may not animate that dimension in that pathway.

Figure 12:
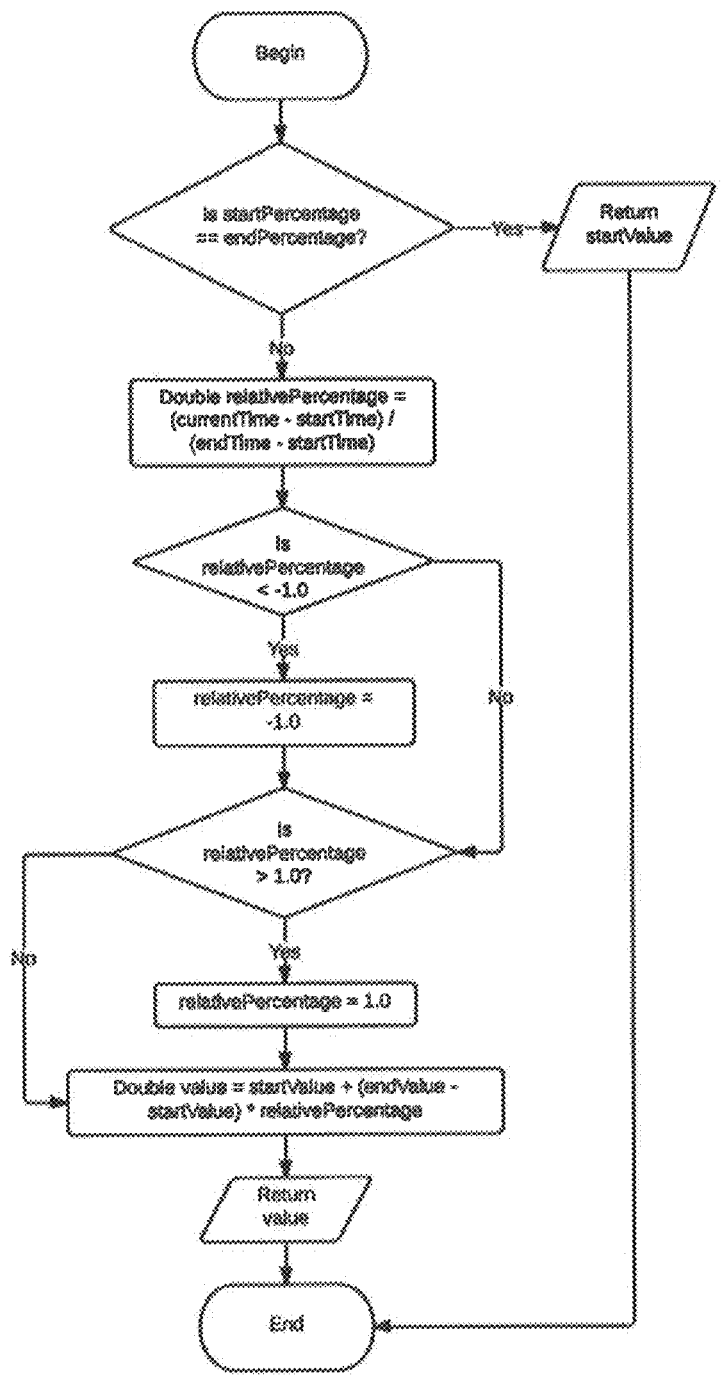
FIG. 12 shows another animation pathway algorithm.

FIG. 12 shows another animation pathways algorithm. In the illustrated algorithm, upon execution the system linearly interpolates.

Figure 13:
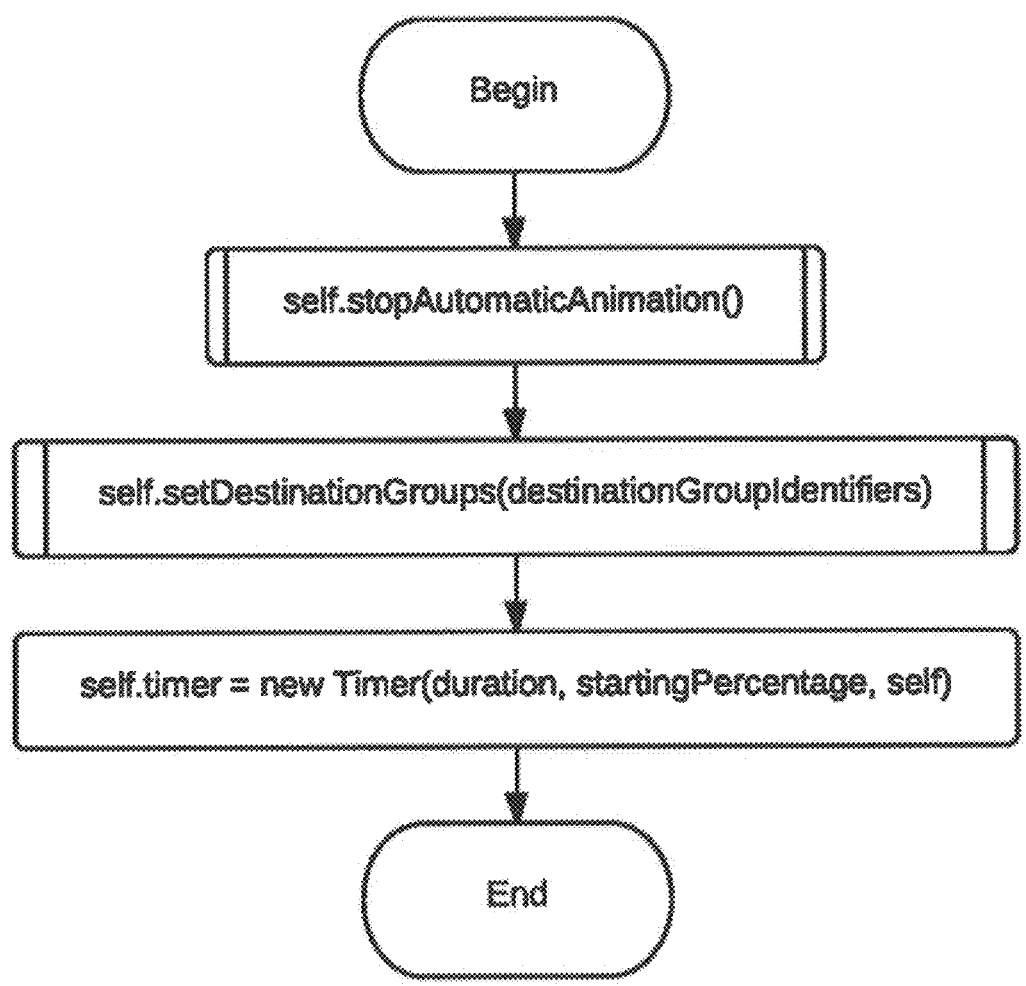
FIG. 13 shows another animation pathway algorithm.

FIG. 13 schematically illustrates an algorithm for an automatic animation. Upon execution, the system stops current animations of an animation pathway coordinator (APC), and instructs the APC to generate the calculated waypoints. The system also creates a timer to run the animation.

Figure 14:
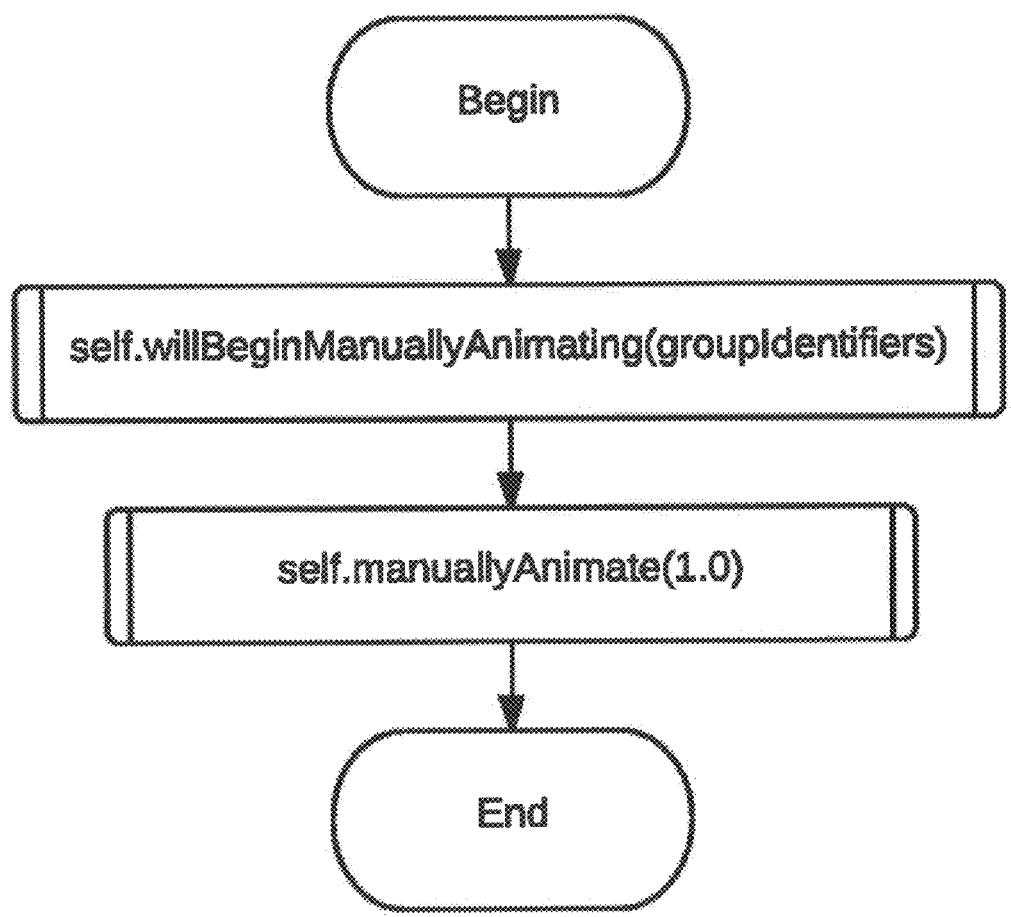
FIG. 14 schematically illustrates an algorithm for manual animation.

FIG. 14 schematically illustrates an algorithm for a jump animation. Upon execution, the APC generates the calculated waypoints and animates to 100%.

Figure 15:
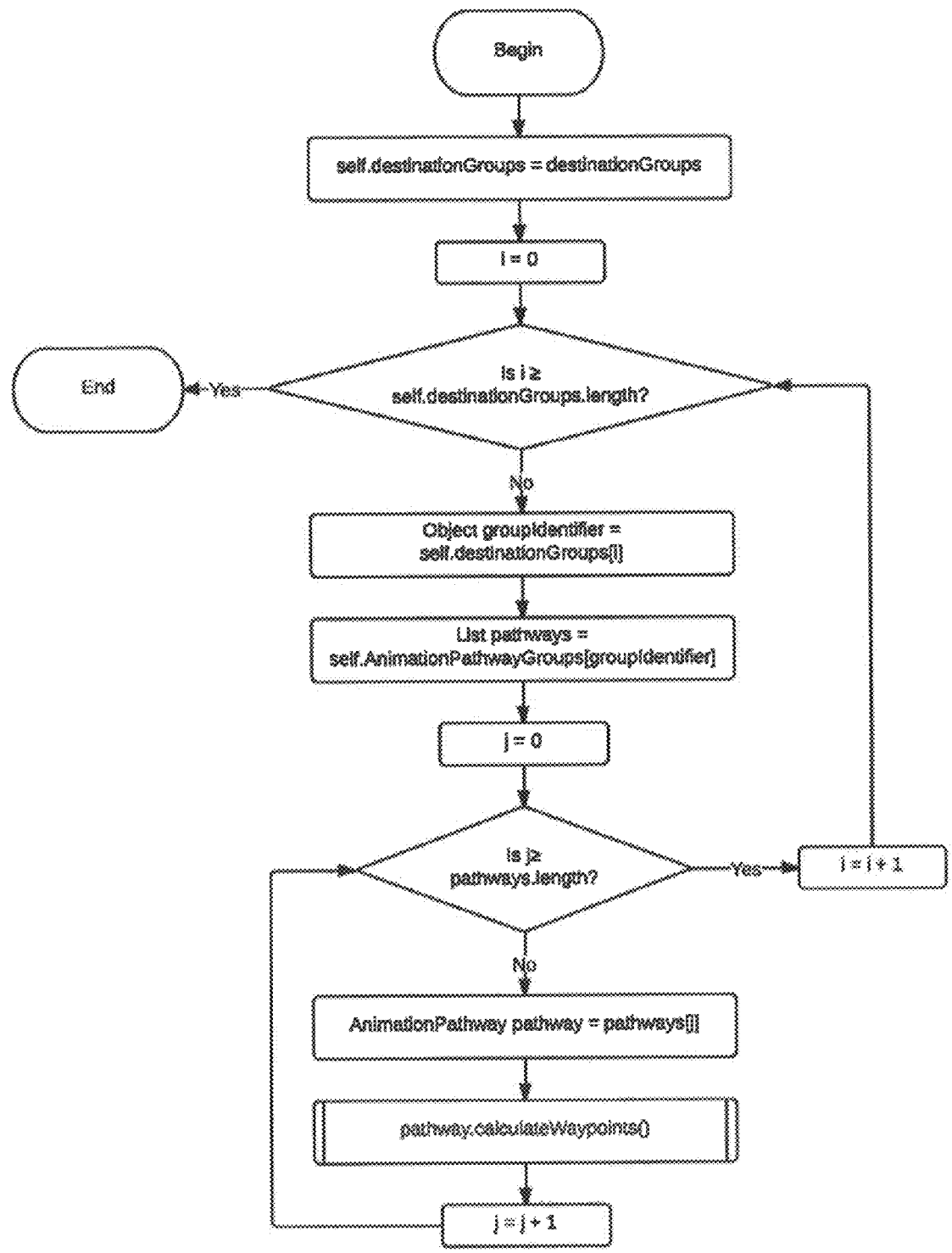
FIG. 15 shows another animation pathway algorithm.

FIG. 15 schematically illustrates another animation algorithm. Upon execution, the system looks up sets of pathways for each group identifier supplied to the system and generates the calculated waypoints for a traversal.

Figure 16:
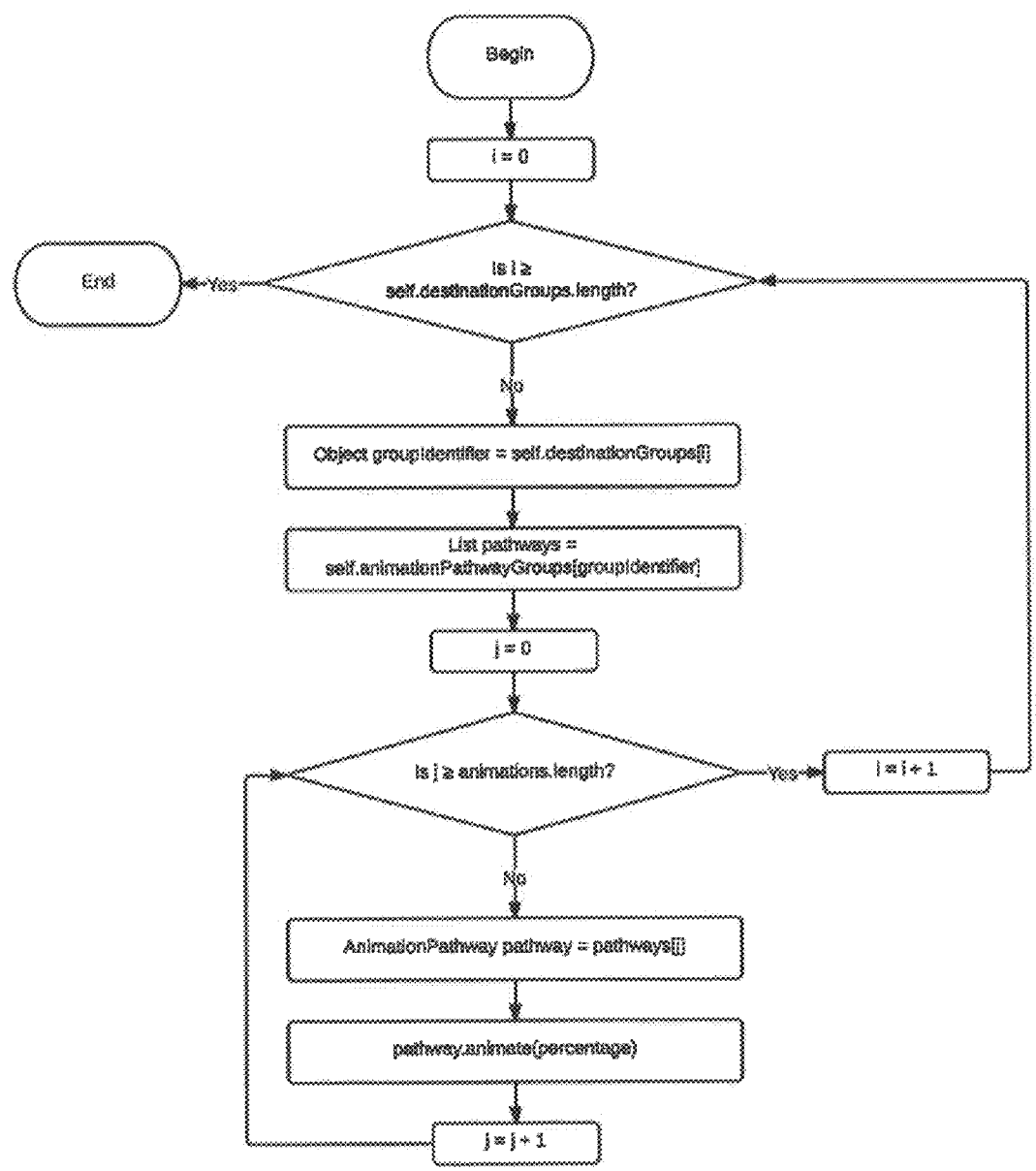
FIG. 16 shows another animation pathway algorithm.

FIG. 16 schematically illustrates another animation algorithm. Upon execution, the system looks up corresponding pathways for destination groups and instructs each of those pathways to animate to a given percentage (e.g., 0%, 50%, 75%, 100%).

Examples of Features

Custom Animatable Properties

Systems of the present disclosure allow developers to define animatable properties other than the typical x- and y-position, scale, rotation, and alpha. For example, a developer can define the glyph colors of text, which can animate by changing colors upon UI input. Any custom property than can be defined in code can be animated by systems provided herein, allowing designers and developers more freedom in creating lively user interfaces.

Automatic Animation Reversion/Completion

In an example, a user interface on an electronic display of system of a user shows a box. By default, the box travels downward, changes size, and changes color. Upon UI input, the animation can smoothly rewind (original or varied speed) and fast-forward (original or varied speed). The system is robust enough to quickly alternate between the options during a single animation.

Reversion lends a sense of continuity to the user experience by allowing the user to devolve through the unique UI configurations encountered during each traversal. Completion allows the user to accelerate through the evolution of the current UI manifestation.

Reversion/Completion of a Manual Gesture

In another example, a user interface on an electronic display of system of a user shows a box. By default, the box travels downward, changes size, and changes color. By default the box is completely driven by gestural input, and it will hold in place unless driven by the user (e.g., upon user input on the electronic display). Enabling the ability to automatically revert and complete the gesture can cause the box to move on its own when it stops receiving input from the user. It will revert (i.e., move back to the top) or complete (finish the traversal) depending on how far it has traveled. Enabling both the revert/complete and threshold abilities will change the point at which autocompletion of the traversal is invoked (e.g., 30% for reversion and 70% for completion), allowing the box to again hold in place during parts of the traversal. Reversion and completion of a manual gesture showcases the combined effects of automatic and manual animations. Intelligently designed user interfaces can tailor the amount of control a user has over an element. This allows the UI to step in where desired without the user feeling like a passive viewer.

Manual Override

In another example, a user interface on an electronic display of system of a user shows a box. By default the box travels downward, changes size, and changes color. A user can override the automatic animation by performing a gesture to "hurry along" or revert the automatic animation. Manual override can give the user more options about how to interact with a UI and customize the user's workflow. It can also eliminate wait time caused by accidentally triggering animated transitions, giving the user more of a sense of control over the UI.

Auto Animation Interruption (Partial Detachment)

In another example, a user interface on an electronic display of system of a user shows a box. By default the box travels downward, changes size, and changes color. Allowing automatic interruptions at various percentages can demonstrate the system's ability to signal app/widget state changes mid-animation. The box "partially detaches" upon interruption, with some parameters in the traversal animating to completely new states (e.g., color, x-position, and size) and some parameters being influenced by the previous traversal (e.g., the y-position is retained). The box's complete or partial deviation from expected behavior can reflect a real-time update of the app's status to the user. For example, say that the box's downward position signifies download progress. Then, partial download progress can be signified by the box's inability to complete the traversal downwards, while the change in color and rightward movement could signify the availability of partially downloaded content for examination.

Manual (Gestural) Animation Interruption

In another example, a user interface on an electronic display of system of a user shows a box. By default the box travels downward, changes size, and changes color. The user can interrupt the automatic animation with a gesture. For example, swiping the box to the right at any time can cause it to hold in place vertically, grow, and change color. With this feature, the user may interact with the UI as quickly and naturally as the user wishes, diverting animations and associated app functionality that is already in progress to some other desired state. The user may no longer have wait for current traversals to conclude before navigating to different UI configurations.

Multiple Animation Interruptions

In another example, a user interface on an electronic display of a system of a user shows a box. By default the box travels downward, changes size, and changes color. Allowing different numbers of interruptions can allow the box to display a variety of behaviors, all of which can signal specific information to the user. The system can handle multiple trajectory recalculations smoothly, allowing the UI to signal complex and/or minute changes in app state. Changing the point at which interruptions occur can demonstrate the system's ability to interrupt at any point on the fly.

Revert and Complete Interruptions

In another example, a user interface on an electronic display of a system of a user shows a box. By default the box automatically animates through four sequential traversals, the last three of which are interruptions at 50% completion of the previous traversal. It then reverts through traversal 4, 3, and 2 before allowing traversal 1 to finish its original traversal. Setting the box to revert to and complete any one of the four traversals can demonstrate the system's ability to rewind through a series of interruptions and complete a chosen traversal as though no interruption ever took place. This feature adds to the user's sense of interacting with a "smart" UI—one that is able to keep up with complex demands of the user.

Revert and Freeze Interruptions

In another example, a user interface on an electronic display of a system of a user shows a box. By default the box automatically animates through four sequential traversals, the last three of which are interruptions. Setting the box to rewind to and freeze at a specific traversal can illustrate the system's ability to rewind through a series of interruptions and settle on a chosen UI configuration midway through a traversal.

Interrupt Reversion

In another example, a user interface on an electronic display of a system of a user shows a box. By default the box automatically animates through four sequential traversals, the last three of which are interruptions. It will then rewind through all four traversals, ending at the original configuration. The user can manually interrupt an automatic animation even during a reversion. Here for example, the system can cause the box to fade out and return to the original configuration when interrupted.

Composable Pathways (1 View)

In another example, a user interface on an electronic display of a system of a user shows a box. By default the box is under the influence of effect Group 1, which changes its color upon execution. The system can quickly and smoothly create layered UI effects by composing them on the fly. Choosing one or more effects groups to apply to the UI element can change its behavior and appearance with relative ease. Group 2 changes the box's size, while Group 3 moves the box downwards. Composability makes it simple for developers to granularly customize a UI with atomistic reusable effects. This can be used to imbue individual UI elements with distinctive effects "personalities" according to their function, or simply to create richer visual metaphors in a process that is easy to plan and execute.

Composable Pathways (2 Views)

In another example, a user interface on an electronic display of a system of a user shows a center square. By default the center square is under the influence of effect Group 1, which changes its color. The system can quickly and easily synchronize the UI effects of more than one UI element, leading to a "coalescence effect" in which multiple UI elements act in unison while maintaining individuality through different styles of movement and appearance.

Composable Pathways (Mixed Groups)

In another example, a user interface on an electronic display of a system of a user shows a center square and a rectangle. By default the center square and the rectangle are under the influence of effect Group 1, which changes the square's color and moves the rectangle to the right (within the plan of the electronic display). The system can smoothly control the parameters of more than one UI view with just one group of instructions. Toggling the groups of effects on and off will change the appearance and behavior of both UI elements. Modulating the properties of more than one UI element offer another layer of control and flexibility to developers. They can design and develop a UI more holistically by focusing on widgets' and views' interactions.

Multiple Starting Configurations

In another example, a user interface on an electronic display of a system of a user shows a box. By default the box travels downward, changes size, and changes color. The box's desired or predetermined end state is to be located at the bottom of the screen with a medium blue color. The system accomplishes the desired end state no matter the starting configuration of the UI. Here, the box reaches its desired end state after being located in a variety of positions. This feature can demonstrate the possibility of foregoing typical paged-based navigation structures in favor of a decoupled system of widgets, the arrangement of which is up to the developer and user.

Multiple Starting Configurations (Pin)

In another example, a user interface on an electronic display of a system of a user shows a box. By default the box changes size and color, but stays in place for most of the animation before moving downward quickly to the bottom of the electronic display. As in the previous example, the box's desired end state is the bottom of the screen with a medium blue color. In a more complex demonstration of "not caring where you come from," the system is able to "pin" the x- and y-position of whatever starting configuration is chosen for the element until most of the animation has finished, then moves the element quickly to the desired destination.

Partial Pathways

In another example, a user interface on an electronic display of a system of a user shows a box. By default the box remains in place and flashes different colors. Using partial pathways with "null values" set for all but chosen parameters (in this example color), the system can apply the flashing effect to any UI element regardless of its current configuration. This feature aids in the creation and composition of atomistic and reusable effects.

Diverted Traversals

In another example, a user interface on an electronic display of a system of a user shows a box. By default the box travels downward, changes size, and changes color when animated to Configuration 1. Quickly pressing all the configuration options allows the user to bounce between traversals quickly and easily, in any order. The buttons' enabled/disabled states are set in blocks of code which are attached to the animation pathway objects, which are executed when a pathway is about to be traversed and when it is ended. This feature creates a more responsive and lightweight user experience, with the user able to navigate quickly to any UI configuration from any current state.

Multiple Animations

Figure 17:
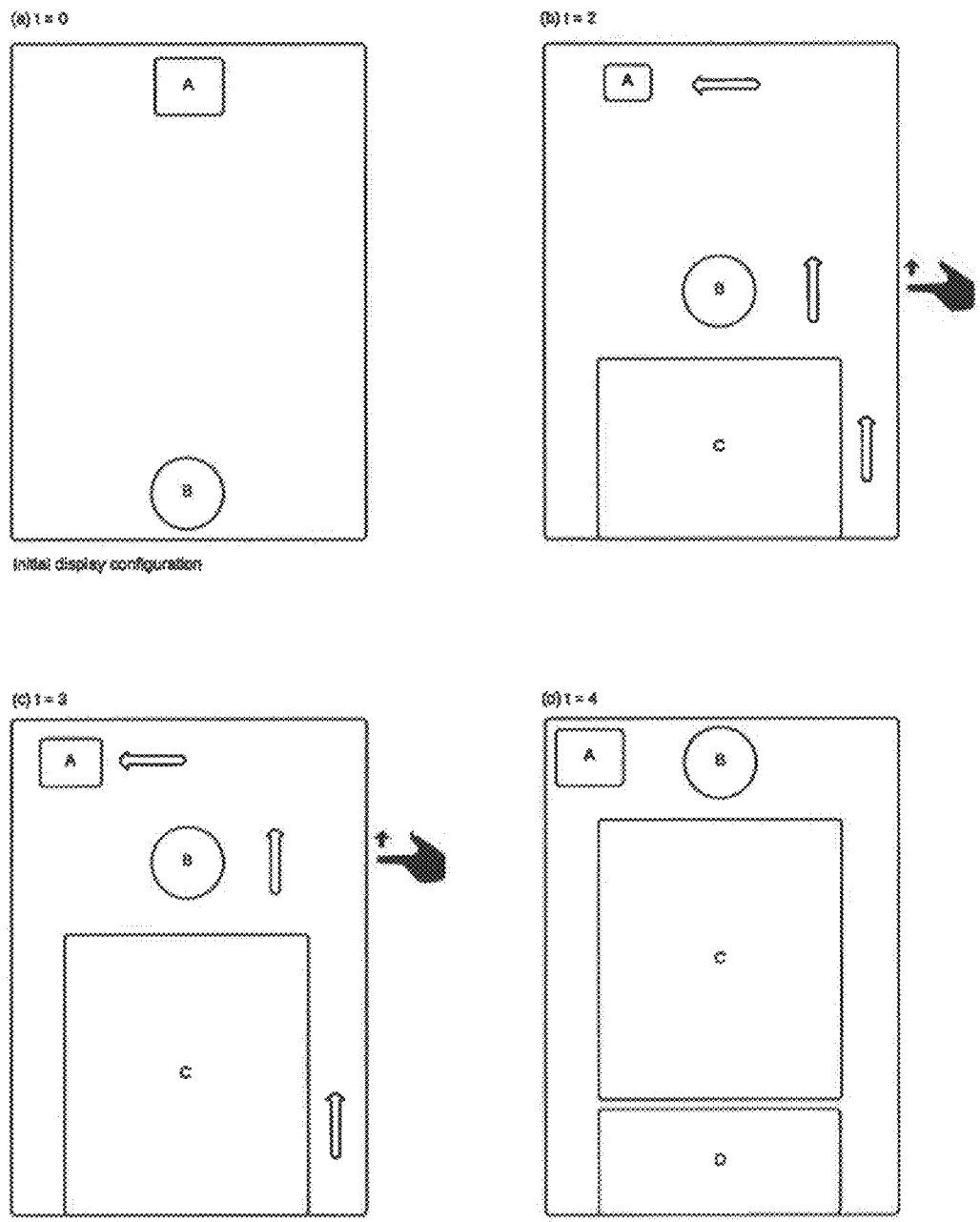
FIG. 17 shows an example user interface with multiple animations.

In another example, a user interface on an electronic display of a system of a user shows boxes and a circle, as shown in FIGS. 17(a)-17(d). In FIG. 17(a), initially (time (t)=0) a first box (A) is at the top of the display and the circle (B) is at the bottom of the display. With reference to FIG. 17(b), at t=2 the user drags the first box (B) towards the top of the display to bring up a second box C and later a third box D. The first box (A) moves slowly to the left of the display, because it has less distance to travel. Concurrently, the first box shrinks in size. With reference to FIG. 17(c), at t=3, the first box (A) continues to move to the left and is in the process of returning to its original size (at t=0). The second box (B) and third box (C) continue to move upwards. With reference to FIG. 17(d), at t=4, the final display configuration is shown. The example of FIG. 17 may be used, for example, in situations in which a user wishes to compose new electronic mail (email).

Figure 18:
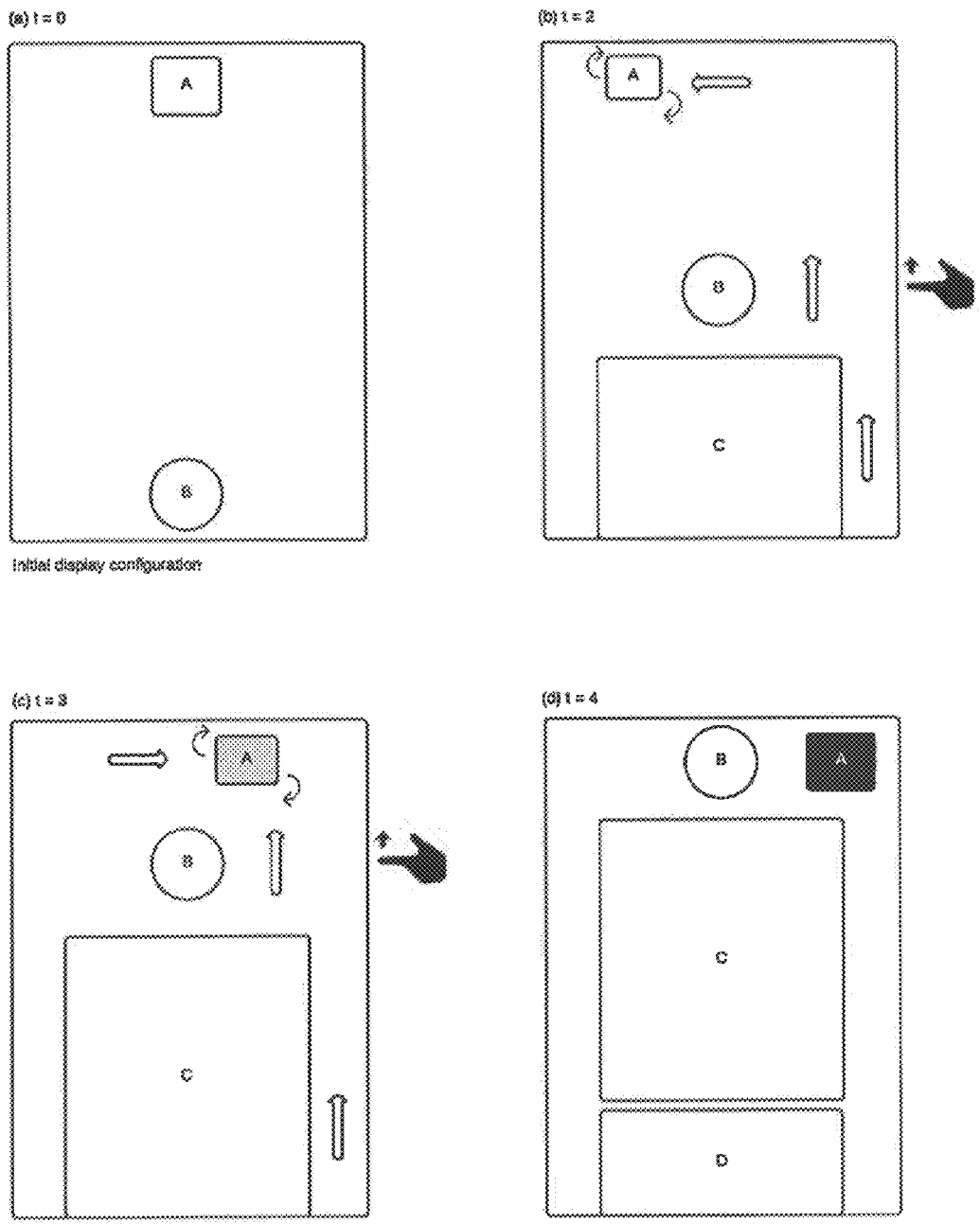
FIG. 18 shows another example user interface with multiple animations.

In an alternative, as shown in FIG. 18, the first box can be further animated based on an alert condition, such as the receipt of a new email. In FIG. 18(a), initially (t=0) the first box (A) is at the top of the display and the circle (B) is at the bottom of the display. With reference to FIG. 18(b), at t=2 the user drags the first box (B) towards the top of the display to bring up a second box C and later a third box D. The first box (A) moves to the left of the display and shrinks in size. However, upon movement of the first box (A), the system receives a new alert (e.g., new email). This triggers a detachable animation, in which case the system causes the first box (A) to rotate based on the alert. With reference to FIG. 18(c), at t=3, the first box (A) has changed direction and moves towards the upper-right corner of the display, which can be a designated area for alerts in the UI. The first box (A) also begins to return to its original size, continues to rotate, and begins to darken in color. The second box (B) and third box (C) continue to move upwards. With reference to FIG. 18(d), at t=4, the final display configuration is shown. The manual gesture comprising the animation of the circle (B) and the second box (C) and third box (D) is completed. The animation of the first box (A) is also completed. The first box (A) is in the upper-right corner of the display and is darkened in color to indicate the alert.

Control Systems

Figure 19:
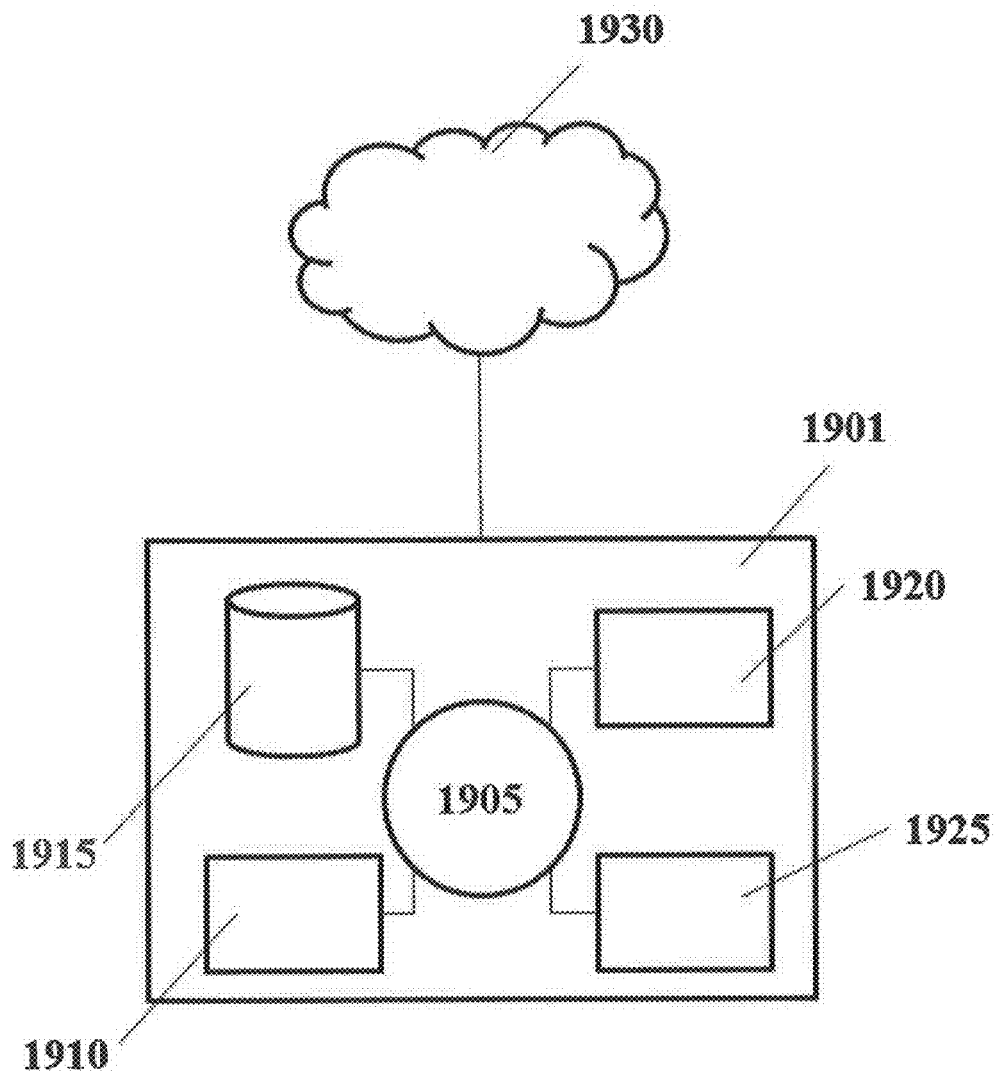
FIG. 19 shows a computer system that is programmed or otherwise configured to implement methods of the present disclosure.

The present disclosure provides computer control systems that are programmed to implement methods of the disclosure. FIG. 19 shows a computer system 1901 that is programmed or otherwise configured to render user interfaces of the present disclosure. The computer system 1901 includes a central processing unit (CPU, also "processor" and "computer processor" herein) 1905, which can be a single core or multi core processor, or a plurality of processors for parallel processing. The computer system 1901 also includes memory or memory location 1910 (e.g., random-access memory, read-only memory, flash memory), electronic storage unit 1915 (e.g., hard disk), communication interface 1920 (e.g., network adapter) for communicating with one or more other systems, and peripheral devices 1925, such as cache, other memory, data storage and/or electronic display adapters. The memory 1910, storage unit 1915, interface 1920 and peripheral devices 1925 are in communication with the CPU 1905 through a communication bus (solid lines), such as a motherboard. The storage unit 1915 can be a data storage unit (or data repository) for storing data. The computer system 1901 can be operatively coupled to a computer network ("network") 1930 with the aid of the communication interface 1920. The network 1930 can be the Internet, an internet and/or extranet, or an intranet and/or extranet that is in communication with the Internet. The network 1930 in some cases is a telecommunication and/or data network. The network 1930 can include one or more computer servers, which can enable distributed computing, such as cloud computing. The network 1930, in some cases with the aid of the computer system 1901, can implement a peer-to-peer network, which may enable devices coupled to the computer system 1901 to behave as a client or a server.

The CPU 1905 can execute a sequence of machine-readable instructions, which can be embodied in a program or software. The instructions may be stored in a memory location, such as the memory 1910. Examples of operations performed by the CPU 1905 can include fetch, decode, execute, and writeback.

The storage unit 1915 can store files, such as drivers, libraries and saved programs. The storage unit 1915 can store user data, e.g., user preferences and user programs. The computer system 1901 in some cases can include one or more additional data storage units that are external to the computer system 1901, such as located on a remote server that is in communication with the computer system 1901 through an intranet or the Internet.

The computer system 1901 can communicate with one or more remote computer systems through the network 1930. For instance, the computer system 1901 can communicate with a remote computer system of a user. Examples of remote computer systems include personal computers (e.g., portable PC), slate or tablet PC's (e.g., Apple@ iPad, Samsung® Galaxy Tab), telephones, Smart phones (e.g., Apple® iPhone, Android-enabled device, Blackberry®), or personal digital assistants. The user can access the computer system 1901 via the network 1930.

Methods as described herein can be implemented by way of machine (e.g., computer processor) executable code stored on an electronic storage location of the computer system 1901, such as, for example, on the memory 1910 or electronic storage unit 1915. The machine executable or machine readable code can be provided in the form of software. During use, the code can be executed by the processor 1905. In some cases, the code can be retrieved from the storage unit 1915 and stored on the memory 1910 for ready access by the processor 1905. In some situations, the electronic storage unit 1915 can be precluded, and machine-executable instructions are stored on memory 1910.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1901 can include or be in communication with an electronic display that comprises a user interface (UI) of the present disclosure. Examples of UI's include, without limitation, a graphical user interface (GUI) and web-based user interface.

Methods and systems of the present disclosure can be implemented by way of one or more algorithms. An algorithm can be implemented by way of software upon execution by one or more computer processors.

The guidelines for operation of various systems described herein are provided for illustrative purposes only. It will be appreciated that other uses and effects, including pathway definitions, are possible.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for displaying an animation in a user interface of an electronic device of a user, comprising:
   (a) providing a computer system comprising a computer processor and an electronic display coupled to the computer processor, wherein the computer processor is programmed to display on the electronic display a user interface (UI) having at least a first animation pathway and a second animation pathway, which animation pathways are programmed to be executed independently of one another with percentage completion; wherein a configuration space for the UI has dimensions of a product of a number of views, a view being a UI element, and a number of animatable properties; wherein an animation pathway is a plurality of coordinates of the configuration space describing a plurality of configuration points, each coordinates of the configuration space for each configuration point having a percentage, the percentage denoting its position in the pathway, associated with said each coordinates of the configuration space; the UI being an animatable UI;
   (b) using the computer processor, generating and displaying the user interface having at least the first animation pathway and the second animation pathway on the electronic display, wherein the animation pathways have different relative velocities as a function of percentage completion regardless of the duration(s) of the animation pathways.

2. The method of claim 1, wherein the animation pathways are not presented on the electronic display concurrently.

3. The method of claim 1, wherein the animation pathways are presented on the electronic display concurrently for at least a portion of a period until the pathways reach completion.

4. The method of claim 1, wherein a first and a second animation have different waypoints.

5. The method of claim 1, wherein the animation pathways comprise UI elements.

6. The method of claim 5, wherein upon execution, UI elements of the animation pathways smoothly converge to a desired final configuration while also completing compartmentalized functions of the animation pathways separately.

7. The method of claim 1, wherein, upon generation, the animation pathways reach full completion at substantially the same time.

8. The method of claim 1, wherein at least one of a first and a second animation is driven by non-deterministic input.

9. The method of claim 1, wherein a first and a second animation are in separate UI subspaces.

10. The method of claim 1, wherein a first animation and/or a second animation does not include a starting point.

11. The method of claim 10, wherein a first animation and/or a second animation further comprises a destination point.

12. A method for displaying an animation in a user interface of an electronic device of a user, comprising:
   (a) providing a computer system comprising a computer processor and an electronic display coupled to the computer processor, wherein the computer processor is programmed to display on the electronic display a user interface (UI) having at least a first animation pathway and a second animation pathway, which animation pathways are programmed to be executed independently of one another with percentage completion; wherein a configuration space for the UI has dimensions of a product of a number of views, a view being a UI element, and a number of animatable properties; wherein an animation pathway is a plurality of coordinates of the configuration space describing a plurality of configuration points, each coordinates of the configuration space for each configuration point having a percentage, the percentage denoting its position in the pathway, associated with said each coordinates of the configuration space; the UI being an animatable UI; and
   (b) using the computer processor, generating and displaying the user interface having at least the first animation pathway and the second animation pathway on the electronic display, wherein the first and second animation pathways are associated with a same UI element(s), wherein at least a portion of the animation pathways are displayed on the electronic display at the same time.

13. The method of claim 12, wherein a first animation is associated with a detachable third animation, which third animation is triggered upon an alert condition.

14. A system for displaying an animation in a user interface of an electronic device of a user, the system comprising:
   one or more processors;
   an electronic display; and
   non-transitory computer usable media, having computer readable code embodied therein, the computer readable code, when executed by the one or more processors, causes the one or more processors to:
   (a) display on the electronic display a user interface (UI) having at least a first animation pathway and a second animation pathway, which animation pathways are programmed to be executed independently of one another with percentage completion; wherein a configuration space for the UI has dimensions of a product of a number of views, a view being a UI element, and a number of animatable properties; wherein an animation pathway is a plurality of coordinates of the configuration space describing a plurality of configuration points, each coordinates of the configuration space for each configuration point having a percentage, the percentage denoting its position in the pathway, associated with said each coordinates of the configuration space; the UI being an animatable UI; and
   (b) generate and display the user interface having at least the first animation pathway and the second animation pathway on the electronic display, wherein the first and second animation pathways have different relative velocities as a function of percentage completion regardless of the duration(s) of the first and second animation pathways.

15. The system of claim 14, wherein the first and second animation pathways are not presented on the electronic display concurrently.

16. The system of claim 14, wherein the animation pathways are presented on the electronic display concurrently for at least a portion of a period until the pathways reach completion.

17. The system of claim 14, wherein a first and a second animations have different waypoints.

18. The system of claim 14, wherein the first and second animation pathways comprise UI elements.

19. A system for displaying an animation in a user interface of an electronic device of a user, the system comprising:

one or more processors;

an electronic display; and non-transitory computer usable media, having computer readable code embodied therein, the computer readable code, when executed by the one or more processors, causes the one or more processors to:

(a) display on the electronic display a user interface (UI) having at least a first animation pathway and a second animation pathway, which animation pathways are programmed to be executed independently of one another with percentage completion; wherein a configuration space for the UI has dimensions of a product of a number of views, a view being a UI element, and a number of animatable properties; wherein an animation pathway is a plurality of coordinates of the configuration space describing a plurality of configuration points, each coordinates of the configuration space for each configuration point having a percentage, the percentage denoting its position in the pathway, associated with said each coordinates of the configuration space; the UI being an animatable UI; and (b) generate and display the user interface having at least the first animation pathway and the second animation pathway on the electronic display, wherein the animation pathways are associated with same UI element(s), wherein at least a portion of the first and second animation pathways are displayed on the electronic display at the same time.

20. The system of claim 19, wherein a first animation is associated with a detachable third animation, which third animation is triggered upon an alert condition.

21. A method for displaying an animation in a user interface of an electronic device of a user, comprising:

(a) providing a computer system comprising a computer processor and an electronic display coupled to the computer processor, wherein the computer processor is programmed to display on the electronic display a user interface (UI) having at least a first animation pathway and a second animation pathway, which animation pathways are programmed to be executed independently of one another with percentage completion; wherein a configuration space for the UI has dimensions of a product of a number of views, a view being a UI element, and a number of animatable properties; wherein an animation pathway is a plurality of coordinates of the configuration space describing a plurality of configuration points, each coordinates of the configuration space for each configuration point having a percentage, the percentage denoting its position in the pathway, associated with said each coordinates of the configuration space; the UI being an animatable UI; and (b) using the computer processor, generating and displaying the user interface having at least the first animation pathway and the second animation pathway on the electronic display, wherein the first and second animation pathways are associated with separate UI elements wherein at least a portion of the animation pathways are displayed on the electronic display at the same time, wherein upon generation and display on the electronic display, UI elements act in unison maintaining individuality through different styles of movement and appearance.

22. The method of claim 21, wherein a first animation is associated with a detachable third animation, which third animation is triggered upon an alert condition.

23. A system for displaying an animation in a user interface of an electronic device of a user, the system comprising:

one or more processors;

an electronic display; and non-transitory computer usable media, having computer readable code embodied therein, the computer readable code, when executed by the one or more processors, causes the one or more processors to:

(a) display on the electronic display a user interface (UI) having at least a first animation pathway and a second animation pathway, which animation pathways are programmed to be executed independently of one another with percentage completion; wherein a configuration space for the UI has dimensions of a product of a number of views, a view being a UI element, and a number of animatable properties; wherein an animation pathway is a plurality of coordinates of the configuration space describing a plurality of configuration points, each coordinates of the configuration space for each configuration point having a percentage, the percentage denoting its position in the pathway, associated with said each coordinates of the configuration space; the UI being an animatable UI; and (b) generate and display the user interface having at least the first animation pathway and the second animation pathway on the electronic display, wherein at least a portion of the first and second animation pathways are displayed on the electronic display at the same time;

wherein the first and second animation pathways are associated with separate UI elements; and wherein upon generation and display on the electronic display, UI elements act in unison maintaining individuality through different styles of movement and appearance.

24. The system of claim 23, wherein a first animation is associated with a detachable third animation, which third animation is triggered upon an alert condition.

* * * * *